US009097944B2

(12) United States Patent
Hirosawa

(10) Patent No.: US 9,097,944 B2
(45) Date of Patent: Aug. 4, 2015

(54) LIQUID CRYSTAL DISPLAY DEVICE HAVING PARTICULAR ELECTRODES STRUCTURE

(71) Applicant: Japan Display Inc., Minato-ku (JP)

(72) Inventor: Jin Hirosawa, Saitama (JP)

(73) Assignee: Japan Display Inc., Minato-ku (JP)

( * ) Notice: Subject to any disclaimer, the term of this patent is extended or adjusted under 35 U.S.C. 154(b) by 101 days.

(21) Appl. No.: 13/904,314

(22) Filed: May 29, 2013

(65) Prior Publication Data

US 2013/0321725 A1   Dec. 5, 2013

(30) Foreign Application Priority Data

May 29, 2012   (JP) .................. 2012-122316

(51) Int. Cl.
  *G02F 1/1343*   (2006.01)
  *G02F 1/141*   (2006.01)
  *G02F 1/1337*   (2006.01)
  *G02F 1/137*   (2006.01)

(52) U.S. Cl.
  CPC   *G02F 1/134363* (2013.01); *G02F 2001/13706* (2013.01); *G02F 2001/133738* (2013.01); *G02F 2001/134318* (2013.01)

(58) Field of Classification Search
  CPC .................... G02F 1/134336; G02F 1/133707; G02F 1/1393; G02F 1/134309; G02F 1/134363; G02F 1/136286; G02F 1/136213; G02F 1/136227; G09G 2310/06; G09G 3/3629; G09G 3/3614
  USPC ...................... 349/143, 139, 37, 39
  See application file for complete search history.

(56) References Cited

U.S. PATENT DOCUMENTS

| 6,266,116 | B1 | 7/2001 | Ohta et al. |
| 2001/0010575 | A1 | 8/2001 | Yoshida et al. |
| 2004/0165136 | A1 | 8/2004 | Sugiyama et al. |
| 2005/0206824 | A1 | 9/2005 | Son et al. |
| 2005/0219453 | A1 | 10/2005 | Kubo et al. |
| 2007/0115234 | A1 | 5/2007 | Kim et al. |
| 2008/0062358 | A1 | 3/2008 | Lee et al. |
| 2008/0180590 | A1 | 7/2008 | Lee et al. |

(Continued)

FOREIGN PATENT DOCUMENTS

| JP | 6-222397 | 8/1994 |
| JP | 7-159807 | 6/1995 |
| JP | 9-160041 | 6/1997 |
| JP | 9-160042 | 6/1997 |

(Continued)

OTHER PUBLICATIONS

U.S. Appl. No. 14/482,802, filed Sep. 10, 2014, Hirosawa, et al.

*Primary Examiner* — Mike Qi
(74) *Attorney, Agent, or Firm* — Oblon, McClelland, Maier & Neustadt, L.L.P.

(57) ABSTRACT

According to one embodiment, a liquid crystal display device includes a first substrate including a first source line and a second source line, a first main pixel electrode of a strip shape, a second main pixel electrode of a strip shape. The first substrate is configured such that a first distance between the first main pixel electrode and the first source line is less than a second distance between the first main pixel electrode and the second source line, and a third distance between the second main pixel electrode and the first source line is greater than a fourth distance between the second main pixel electrode and the second source line.

6 Claims, 12 Drawing Sheets

(56) References Cited

U.S. PATENT DOCUMENTS

| | | |
|---|---|---|
| 2008/0180623 A1 | 7/2008 | Lee et al. |
| 2008/0186439 A1 | 8/2008 | Kwon et al. |
| 2013/0010237 A1* | 1/2013 | Fujiyama et al. ............. 349/103 |
| 2013/0016297 A1* | 1/2013 | Nakamura ...................... 349/46 |
| 2013/0033661 A1* | 2/2013 | Kozuka et al. .................. 349/96 |
| 2013/0033663 A1* | 2/2013 | Tago et al. .................... 349/103 |
| 2013/0050601 A1* | 2/2013 | Takeda et al. ................... 349/41 |
| 2013/0050604 A1* | 2/2013 | Yonekura et al. ............... 349/43 |

FOREIGN PATENT DOCUMENTS

| | | |
|---|---|---|
| JP | 9-160061 | 6/1997 |
| JP | 10-26765 | 1/1998 |
| JP | 10-90708 | 4/1998 |
| JP | 2005-3802 | 1/2005 |
| JP | 3644653 | 2/2005 |
| JP | 2005-242307 | 9/2005 |
| JP | 2009-192822 | 8/2009 |
| JP | 2011-209454 | 10/2011 |

* cited by examiner

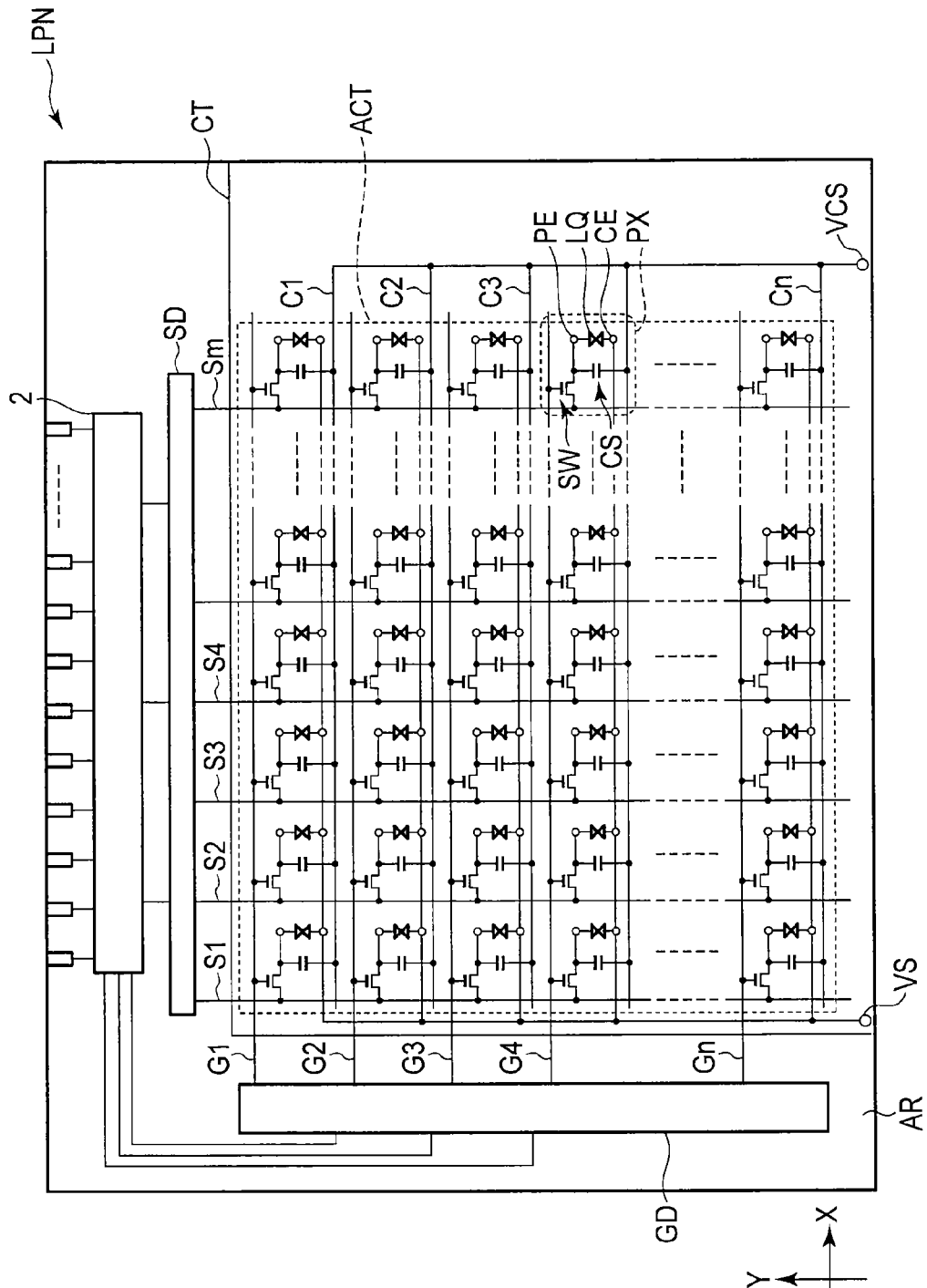
F I G. 1

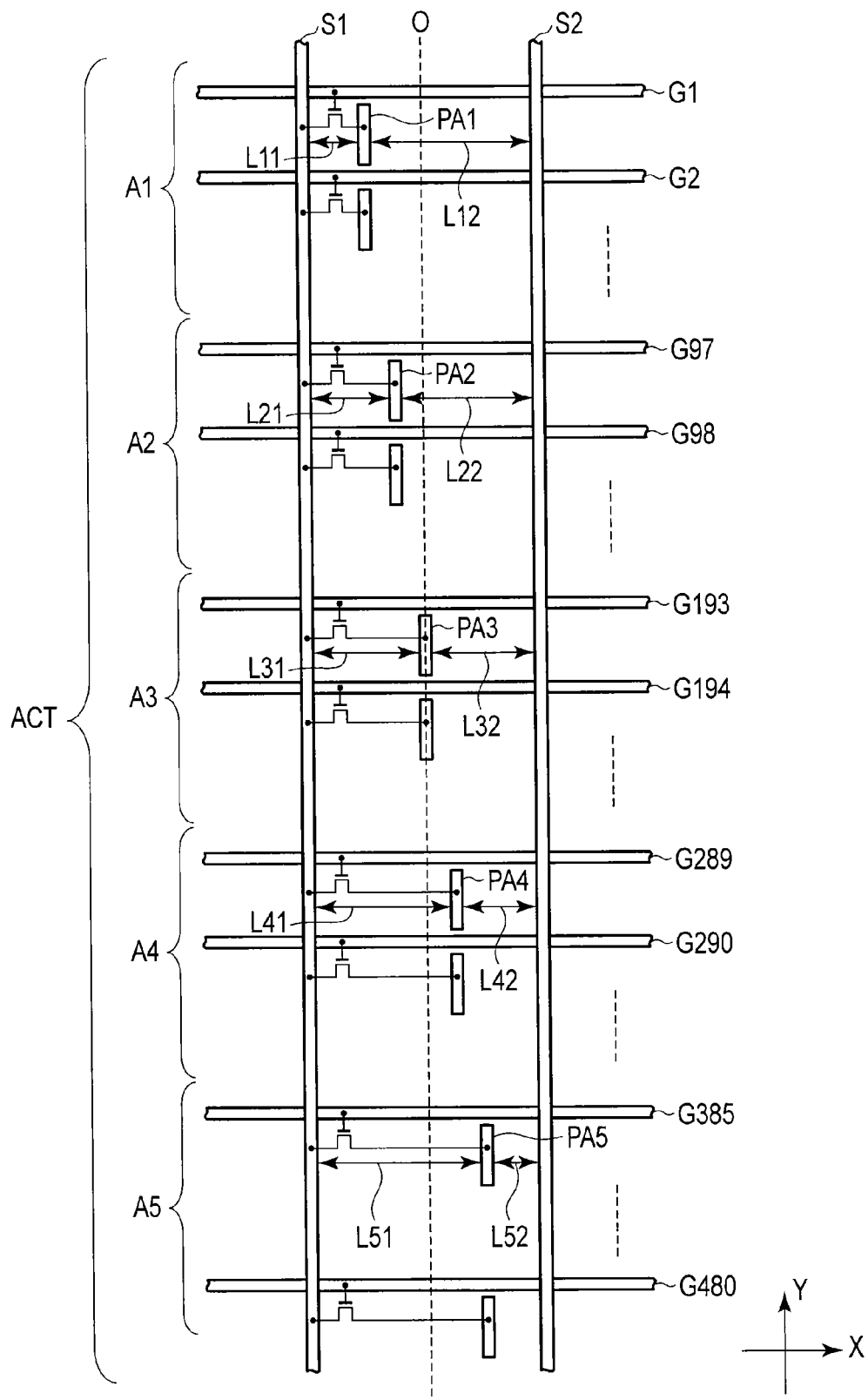
F I G. 6

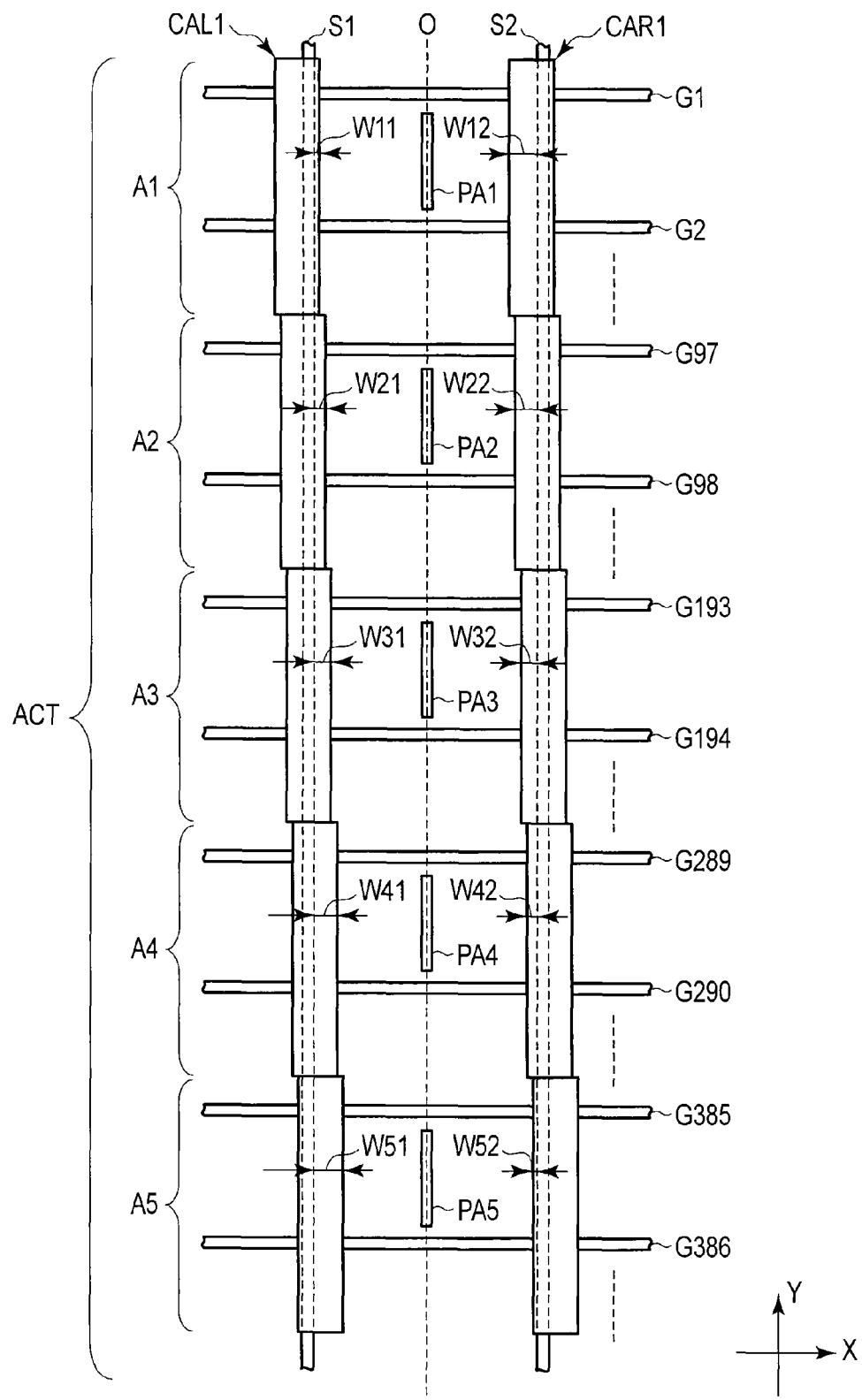
F I G. 8

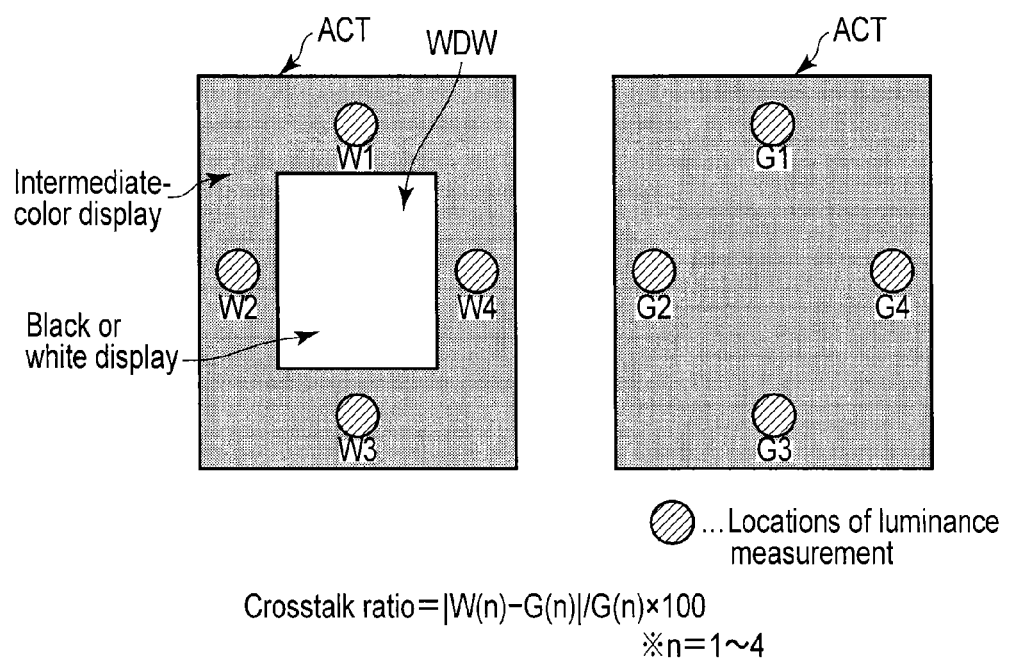
F I G. 12

LIQUID CRYSTAL DISPLAY DEVICE HAVING PARTICULAR ELECTRODES STRUCTURE

CROSS-REFERENCE TO RELATED APPLICATIONS

This application is based upon and claims the benefit of priority from Japanese Patent Application No. 2012-122316, filed May 29, 2012, the entire contents of which are incorporated herein by reference.

FIELD

Embodiments described herein relate generally to a liquid crystal display device.

BACKGROUND

In recent years, in active matrix liquid crystal devices in which switching elements are incorporated in respective pixels, configurations, which make use of a lateral electric field (including a fringe electric field), such as an IPS (In-Plane Switching) mode or an FFS (Fringe Field Switching) mode, have been put to practical use. Such a liquid crystal display device of the lateral electric field mode includes pixel electrodes and a counter-electrode, which are formed on an array substrate, and liquid crystal molecules are switched by a lateral electric field which is substantially parallel to a major surface of the array substrate. In connection with the lateral electric field mode, there has been proposed a technique wherein a lateral electric field or an oblique electric field is produced between a pixel electrode formed on an array substrate and a counter-electrode formed on a counter-substrate, thereby switching liquid crystal molecules.

BRIEF DESCRIPTION OF THE DRAWINGS

FIG. 1 is a view which schematically illustrates a structure and an equivalent circuit of a liquid crystal display device according to an embodiment.

FIG. 6 is a schematic view for describing a first structure example of the embodiment.

FIG. 8 is a schematic view for describing a second structure example of the embodiment.

FIG. 12 is a view for explaining the definition of a crosstalk ratio which is introduced in the present embodiment.

DETAILED DESCRIPTION

Figure 2:
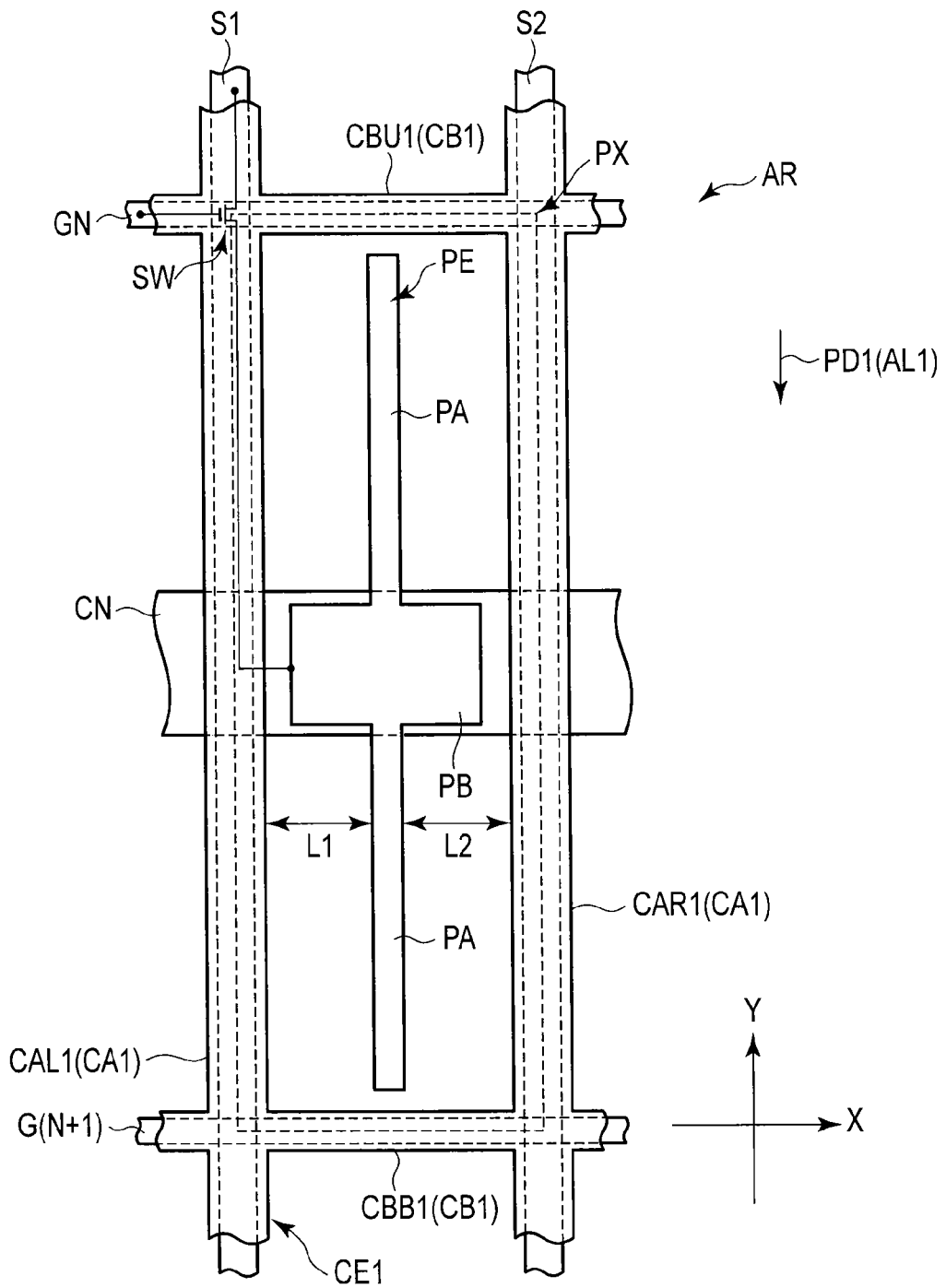
FIG. 2 is a plan view which schematically shows a structure example of one pixel at a time when an array substrate shown in FIG. 1 is viewed from a counter-substrate side.

In general, according to one embodiment, a liquid crystal display device includes: a first substrate including a first source line and a second source line which are disposed with a distance in a first direction and extend in a second direction perpendicular to the first direction from a first area on a video signal write start side to a second area on a video signal write end side, a first main pixel electrode of a strip shape which is electrically connected to the first source line in the first area, is located between the first source line and the second source line and extends in the second direction, a second main pixel electrode of a strip shape which is electrically connected to the first source line in the second area, is located between the first source line and the second source line and extends in the second direction, a first main common electrode opposed to the first source line, and a second main common electrode having the same potential as the first main common electrode and opposed to the second source line, the first substrate being configured such that a first distance between the first main pixel electrode and the first source line is less than a second distance between the first main pixel electrode and the second source line, and a third distance between the second main pixel electrode and the first source line is greater than a fourth distance between the second main pixel electrode and the second source line; a second substrate disposed to be opposed to the first substrate; and a liquid crystal layer held between the first substrate and the second substrate.

According to another embodiment, a liquid crystal display device includes: a first substrate including a first source line and a second source line which are disposed with a distance in a first direction and extend in a second direction perpendicular to the first direction from a first area on a video signal write start side to a second area on a video signal write end side, a first main pixel electrode of a strip shape which is electrically connected to the first source line in the first area, is located between the first source line and the second source line and extends in the second direction, a second main pixel electrode of a strip shape which is electrically connected to the first source line in the second area, is located between the first source line and the second source line and extends in the second direction, a first main common electrode opposed to the first source line, and a second main common electrode having the same potential as the first main common electrode and opposed to the second source line, the first substrate being configured such that a first width of that portion of the first main common electrode, which extends from the first source line toward the first main pixel electrode, is less than a second width of that portion of the second main common electrode, which extends from the second source line toward the first main pixel electrode, and a third width of that portion of the first main common electrode, which extends from the first source line toward the second main pixel electrode, is greater than a fourth width of that portion of the second main common electrode, which extends from the second source line toward the second main pixel electrode; a second substrate disposed to be opposed to the first substrate; and a liquid crystal layer held between the first substrate and the second substrate.

According to another embodiment, a liquid crystal display device includes: a first substrate including a first storage capacitance line located in a first area on a video signal write start side and extending in a first direction, a second storage capacitance line located in a second area on a video signal write end side and extending in the first direction, a first source line and a second source line which are disposed with a distance in the first direction and extend in a second direction perpendicular to the first direction from the first area to the second area, a first main pixel electrode of a strip shape which is electrically connected to the first source line in the first area, is located between the first source line and the second source line and extends in the second direction, a second main pixel electrode of a strip shape which is electrically connected to the first source line in the second area, is located between the first source line and the second source line and extends in the second direction, a first main common electrode opposed to the first source line, and a second main common electrode having the same potential as the first main common electrode and opposed to the second source line, the first storage capacitance line including a first electrode portion extending with a first width toward the first main pixel electrode from the first source line, and a second electrode portion extending with a second width, which is greater than the first width, toward the first main pixel electrode from the second source line, and the second storage capacitance line including a third electrode portion extending with a third width toward the second main pixel electrode from the first source line, and a fourth electrode portion extending with a fourth width, which is less than the third width, toward the second main pixel electrode from the second source line; a second substrate disposed to be opposed to the first substrate; and a liquid crystal layer held between the first substrate and the second substrate.

Embodiments will now be described in detail with reference to the accompanying drawings. In the drawings, structural elements having the same or similar functions are denoted by like reference numerals, and an overlapping description is omitted.

FIG. 1 is a view which schematically shows a structure and an equivalent circuit of a liquid crystal display device according to an embodiment.

The liquid crystal display device includes an active-matrix-type liquid crystal display panel LPN. The liquid crystal display panel LPN includes an array substrate AR which is a first substrate, a counter-substrate CT which is a second substrate that is disposed to be opposed to the array substrate AR, and a liquid crystal layer LQ which is held between the array substrate AR and the counter-substrate CT. The liquid crystal display panel LPN includes an active area ACT which displays an image. The active area ACT is composed of a plurality of pixels PX which are arrayed in a matrix of m×n (m and n are positive integers).

The liquid crystal display panel LPN includes, in the active area ACT, gate lines G (G1 to Gn), storage capacitance lines C (C1 to Cn), and source lines S (S1 to Sm). The gate lines G correspond to signal lines which extend, for example, substantially linearly in a first direction X. The source lines S cross the gate lines G. The source lines S correspond to signal lines which extend substantially linearly in a second direction Y crossing the first direction X. In this example, the first direction X and the second direction Y are substantially perpendicular to each other.

Each of the gate lines G is led out of the active area ACT and is connected to a gate driver GD. Each of the source lines S is led out of the active area ACT and is connected to a source driver SD. At least parts of the gate driver GD and source driver SD are formed on, for example, the array substrate AR. The gate driver GD and source driver SD are connected to a driving IC chip 2 which incorporates a controller.

Each of the pixels PX includes a switching element SW, a pixel electrode PE and a common electrode CE. A storage capacitance CS is formed, for example, between the storage capacitance line C and the pixel electrode PE. The storage capacitance line C is electrically connected to a voltage application module VCS to which a storage capacitance voltage is applied.

In the present embodiment, the liquid crystal display panel LPN is configured such that the pixel electrodes PE are formed on the array substrate AR, and at least a part of the common electrode CE is formed on the counter-substrate CT, and liquid crystal molecules of the liquid crystal layer LQ are switched by mainly using an electric field which is produced between the pixel electrodes PE and the common electrode CE. The electric field, which is produced between the pixel electrodes PE and the common electrode CE, is an oblique electric field which is slightly inclined to an X-Y plane (or a substrate major surface) which is defined by the first direction X and second direction Y (or a lateral electric field which is substantially parallel to the substrate major surface).

The switching element SW is composed of, for example, an n-channel thin-film transistor (TFT). The switching element SW is electrically connected to the gate line G and source line S. The switching element SW may be of a top gate type or a bottom gate type. In addition, a semiconductor layer of the switching element SW is formed of, for example, polysilicon, but it may be formed of amorphous silicon.

The pixel electrodes PE are disposed in the respective pixels PX, and are electrically connected to the switching elements SW. The common electrode CE has, for example, a common potential, and is disposed common to the pixel electrodes PE of plural pixels PX via the liquid crystal layer LQ. The pixel electrodes PE and common electrode CE are formed of, for example, a transparent, electrically conductive material such as indium tin oxide (ITO) or indium zinc oxide (IZO), but they may be formed of some other electrically conductive material such as an opaque wiring material.

The array substrate AR includes a power supply module VS for applying a voltage to the common electrode CE. The power supply module VS is formed, for example, on the outside of the active area ACT. The common electrode CE of the counter-substrate CT is led out to the outside of the active area ACT, and is electrically connected to the power supply module VS via an electrically conductive member (not shown).

Next, the basic structure of one pixel disposed in the active area will be described.

FIG. 2 is a plan view which schematically shows a structure example of one pixel PX at a time when the array substrate AR shown in FIG. 1 is viewed from the counter-substrate side. FIG. 2 is a plan view in an X-Y plane.

The array substrate AR includes a gate line GN, a gate line G(N+1), a storage capacitance line CN, a source line S1, a source line S2, a switching element SW, a pixel electrode PE, and a first alignment film AL1 (N is a positive integer). In the first structure example illustrated, the array substrate AR further includes a first common electrode CE1 which is a part of the common electrode CE.

In the example illustrated, as indicated by a broken line, the pixel PX has a rectangular shape having a less length in the first direction X than in the second direction Y. The gate line GN and gate line G(N+1) are disposed with a distance in the second direction Y, and extend in the first direction X. The storage capacitance line CN is disposed between the gate line GN and gate line G(N+1), and extends in the first direction X. In the example illustrated, the storage capacitance line CN is located at a substantially middle point between the gate line GN and the gate line G(N+1). The source line S1 and source line S2 are disposed with a distance in the first direction X, and extend in the second direction Y. The length of the pixel PX in the first direction X corresponds to the pitch between the source line S1 and source line S2 in the first direction X. The length of the pixel PX in the second direction Y corresponds to the pitch between the gate line GN and gate line G(N+1) in the second direction Y. The pixel electrode PE is disposed between the neighboring source line S1 and source line S2. In addition, the pixel electrode PE is disposed between the gate line GN and gate line G(N+1).

In the pixel PX illustrated, the source line S1 is disposed at a left side end portion, the source line S2 is disposed at a right side end portion, the gate line GN is disposed at an upper side end portion, and the gate line G(N+1) is disposed at a lower side end portion. Strictly speaking, the source line S1 is disposed to extend over a boundary between the pixel PX and a pixel neighboring on the left side, the source line S2 is disposed to extend over a boundary between the pixel PX and a pixel neighboring on the right side, the gate line GN is disposed to extend over a boundary between the pixel PX and a pixel neighboring on the upper side, and the gate line G(N+1) is disposed to extend over a boundary between the pixel PX and a pixel neighboring on the lower side.

The switching element SW, in the illustrated example, is electrically connected to the gate line GN and source line S1. The switching element SW is provided at an intersection between the gate line GN and source line S1. The gate electrode of the switching element SW is electrically connected to the gate line GN. The source electrode of the switching element SW is electrically connected to the source line S1. The drain electrode of the switching element SW, which is connected to a drain wiring extending along the source line S1 and storage capacitance line CN, is electrically connected to the pixel electrode PE.

The pixel electrode PE includes a main pixel electrode PA and a sub-pixel electrode PB. The main pixel electrode PA and sub-pixel electrode PB are formed integral or continuous, and are electrically connected to each other. The main pixel electrode PA is located between the source line S1 and source line S2, and linearly extends in the second direction Y to the vicinity of the upper side end portion of the pixel PX and to the vicinity of the lower side end portion of the pixel PX. In the example illustrated, the main pixel electrode PA is located at a substantially middle point between the source line S1 and source line S2. Specifically, a distance L1 in the first direction X between the source line S1 and main pixel electrode PA is substantially equal to a distance L2 in the first direction X between the source line S2 and main pixel electrode PA. The main pixel electrode PA is formed in a strip shape having a substantially uniform width in the first direction X.

The sub-pixel electrode PB is located at a substantially central part of the pixel PX, and linearly extends in the first direction X. In the example illustrated, the sub-pixel electrode PB is located at a position overlapping the storage capacitance line CN, and crosses a substantially middle portion in the second direction Y of the main pixel electrode PA. In other words, the sub-pixel electrode PB extends from the main pixel electrode PA towards both the source line S1 and source line S2. The sub-pixel electrode PB is electrically connected to the switching element SW at a position overlapping the storage capacitance line CN. Although the sub-pixel electrode PB is formed in a strip shape having a substantially uniform width in the second direction Y, the shape of the sub-pixel electrode PB is not limited to this example. Although the sub-pixel electrode PB is provided in order to form a greater number of domains in one pixel, as will be described later, the sub-pixel electrode PB2 may be omitted in the present embodiment.

The first common electrode CE1 includes a first main common electrode CA1 and a first sub-common electrode CB1. The first main common electrode CA1 and first sub-common electrode CB1 are formed integral or continuous, and are electrically connected to each other. The first main common electrode CA1, in the X-Y plane, is located on both sides of the main pixel electrode PA, and linearly extends in the second direction Y. The first main common electrode CA1 is formed at a position opposed to the source line S. The first main common electrode CA1 is formed in a strip shape having a substantially uniform width in the first direction X. In the example illustrated, the first main common electrode CA1 includes two first main common electrodes arranged in parallel with a distance in the first direction X, namely a first main common electrode CAL1 disposed at the left side end portion of the pixel PX, and a first main common electrode CAR1 disposed at the right side end portion of the pixel PX. Strictly speaking, the first main common electrode CAL1 is disposed to extend over a boundary between the pixel PX and a pixel neighboring on the left side, and the first main common electrode CAR1 is disposed to extend over a boundary between the pixel PX and a pixel neighboring on the right side. The first main common electrode CAL1 is opposed to the source line S1, and the first main common electrode CAR1 is opposed to the source line S2. In the meantime, although the first main common electrode CA1 is provided, for example, in order to shield an undesired electric field from the source line S, the first main common electrode CA1 may be omitted in the present embodiment.

The first sub-common electrode CB1, in the X-Y plane, linearly extends in the first direction X. The first sub-common electrode CB1 is formed at a position opposed to the gate line G. The first sub-common electrode CB1 is formed in a strip shape. Incidentally, the width of the first sub-common electrode CB1 in the second direction Y may not necessarily be uniform. In the example illustrated, the first sub-common electrode CB1 includes two first sub-common electrodes arranged in parallel with a distance in the second direction Y, namely a first sub-common electrode CBU1 disposed at the upper side end portion of the pixel PX, and a first sub-common electrode CBB1 disposed at the lower side end portion of the pixel PX. Strictly speaking, the first sub-common electrode CBU1 is disposed to extend over a boundary between the pixel PX and a pixel neighboring on the upper side, and the first sub-common electrode CBB1 is disposed to extend over a boundary between the pixel PX and a pixel neighboring on the lower side. Specifically, in the example illustrated, the first common electrode CE1 is formed of the first main common electrode CA1 and first sub-common electrode CB1 in a grid shape which partitions the pixel PX. The first sub-common electrode CBU1 is opposed to the gate line GN. The first sub-common electrode CBB1 is opposed to the gate line G(N+1). In the meantime, although the first sub-common electrode CB1 is provided, for example, in order to shield an undesired electric field from the gate line G, the first sub-common electrode CB1 may be omitted in the present embodiment.

Paying attention to the positional relationship between the pixel electrode PE and the first common electrode CE1, the main pixel electrode PA and first main common electrode CA1 are substantially parallel in the X-Y plane, and are alternately arranged in the first direction X. Specifically, one main pixel electrode PA is located between the first main common electrode CAL1 and first main common electrode CAR1 which neighbor with a distance in the first direction X (or between the neighboring source lines).

In the array substrate AR, the pixel electrode PE and first common electrode CE1 are covered with the first alignment film AL1. The first alignment film AL1 is subjected to alignment treatment (e.g. rubbing treatment or optical alignment treatment) in a first alignment treatment direction PD1 for initially aligning the liquid crystal molecules of the liquid crystal layer LQ. The first alignment treatment direction PD1, in which the first alignment film AL1 initially aligns the liquid crystal molecules, is substantially parallel to the second direction Y.

Figure 3:
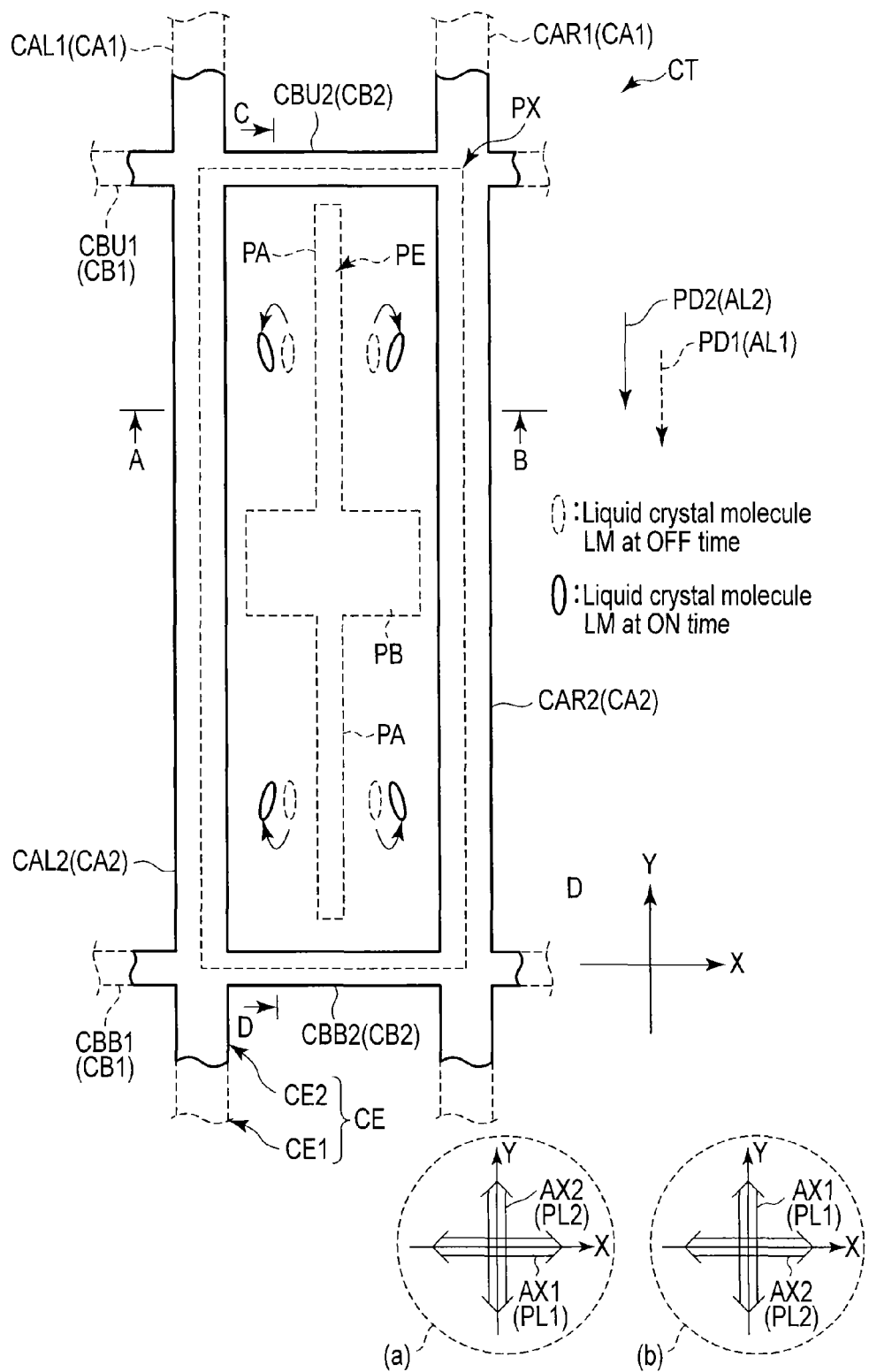
FIG. 3 is a plan view which schematically shows a structure example of one pixel in a counter-substrate shown in FIG. 1.

FIG. 3 is a plan view which schematically shows a structure example of one pixel PX in the counter-substrate CT shown in FIG. 1. FIG. 3 shows a plan view in the X-Y plane. FIG. 3 shows only structural parts that are necessary for the description, and the pixel electrode PE and first common electrode CE1, which are main parts of the array substrate, are indicated by broken lines.

The counter-substrate CT includes a second common electrode CE2 which is a part of the common electrode CE. The second common electrode CE2 includes a second main common electrode CA2 and a second sub-common electrode CB2. The second main common electrode CA2 and second sub-common electrode CB2 are formed integral or continuous, and are electrically connected to each other. In addition, the second main common electrode CA2 and second sub-common electrode CB2 are electrically connected to the first common electrode CE1 which is provided on the array substrate, for example, on the outside of the active area, and have the same potential as the first common electrode CE1.

The second main common electrode CA2, in the X-Y plane, is located on both sides of the main pixel electrode PA, and linearly extends in the second direction Y. The second main common electrode CA2 is formed at a position opposed to the first main common electrode CA1. The second main common electrode CA2 is formed in a strip shape having a substantially uniform width in the first direction X. In the example illustrated, the second main common electrode CA2 includes two second main common electrodes arranged in parallel with a distance in the first direction X, namely a second main common electrode CAL2 disposed at the left side end portion of the pixel PX, and a second main common electrode CAR2 disposed at the right side end portion of the pixel PX. Strictly speaking, the second main common electrode CAL2 is disposed to extend over a boundary between the pixel PX and a pixel neighboring on the left side, and the second main common electrode CAR2 is disposed to extend over a boundary between the pixel PX and a pixel neighboring on the right side. The second main common electrode CAL2 is opposed to the first main common electrode CAL1. The second main common electrode CAR2 is opposed to the first main common electrode CAR1.

The second sub-common electrode CB2, in the X-Y plane, linearly extends in the first direction X. The second sub-common electrode CB2 is formed at a position opposed to the first sub-common electrode CB1. The second sub-common electrode CB2 is formed in a strip shape having a substantially uniform width in the second direction Y. In the example illustrated, the second sub-common electrode CB2 includes two second sub-common electrodes arranged in parallel with a distance in the second direction Y, namely a second sub-common electrode CBU2 disposed at the upper side end portion of the pixel PX, and a second sub-common electrode CBB2 disposed at the lower side end portion of the pixel PX. Strictly speaking, the second sub-common electrode CBU2 is disposed to extend over a boundary between the pixel PX and a pixel neighboring on the upper side, and the second sub-common electrode CBB2 is disposed to extend over a boundary between the pixel PX and a pixel neighboring on the lower side. Specifically, in the counter-substrate CT, the second common electrode CE2 is formed of the second main common electrode CA2 and second sub-common electrode CB2 in a grid shape which partitions the pixel PX. The second sub-common electrode CBU2 is opposed to the first sub-common electrode CBU1, and the second sub-common electrode CBB2 is opposed to the first sub-common electrode CBB1.

In the counter-substrate CT, the second common electrode CE2 is covered with the second alignment film AL2. The second alignment film AL2 is subjected to alignment treatment (e.g. rubbing treatment or optical alignment treatment) in a second alignment treatment direction PD2 for initially aligning the liquid crystal molecules of the liquid crystal layer LQ. The second alignment treatment direction PD2, in which the second alignment film AL2 initially aligns the liquid crystal molecules, is substantially parallel to the first alignment treatment direction PD1. In the example illustrated, the second alignment treatment direction PD2 and the first alignment treatment direction PD1 are identical. In the meantime, the first alignment treatment direction PD1 and the second alignment treatment direction PD2 may be opposite to each other, or may be identical in a direction reverse to the direction in the illustrated example, that is, in a direction from the gate line G(N+1) toward the gate line GN.

Figure 4:
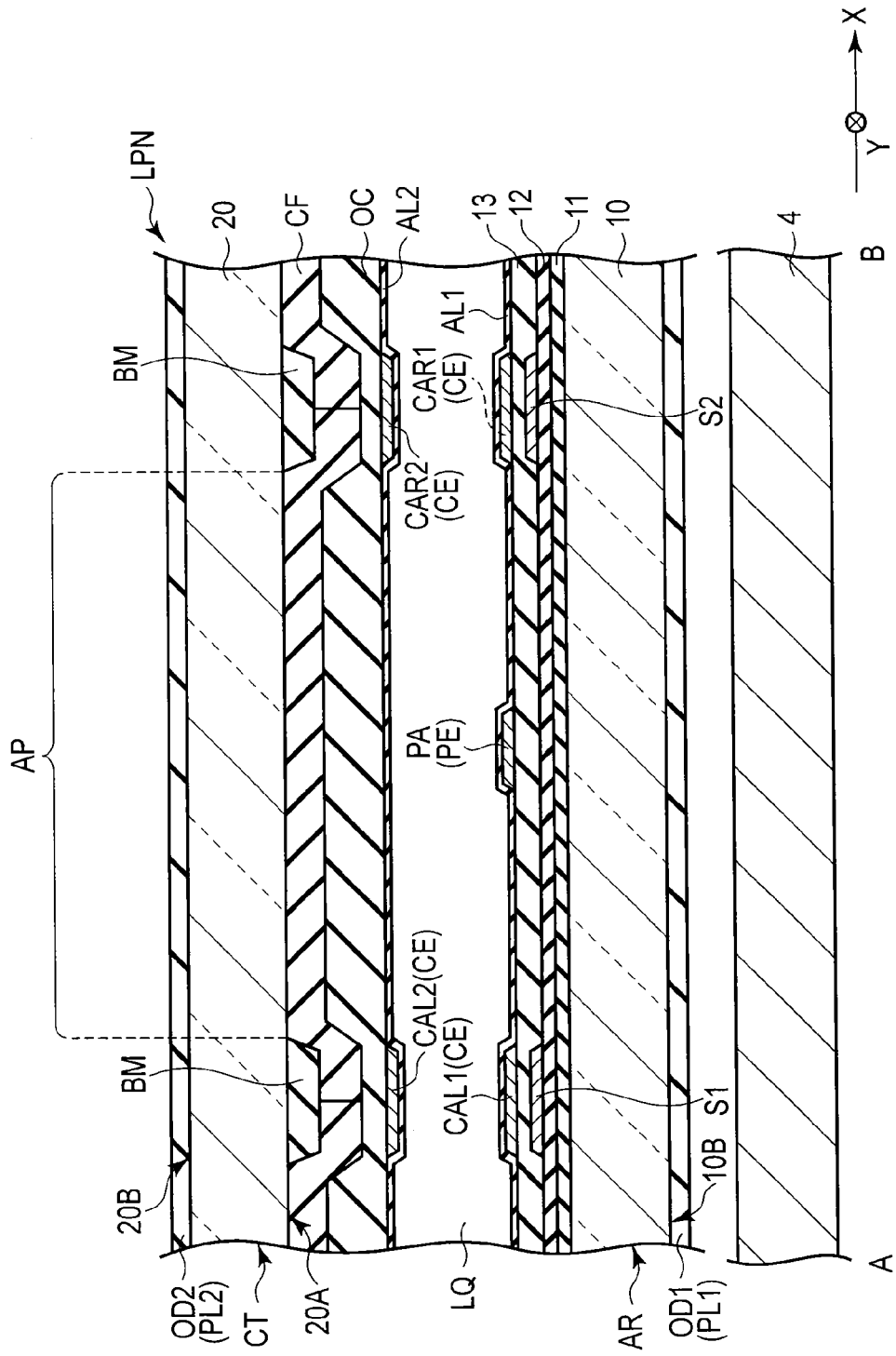
FIG. 4 is a schematic cross-sectional view, taken along line A-B in FIG. 3, showing a cross-sectional structure of a liquid crystal display panel shown in FIG. 3.
Figure 5:
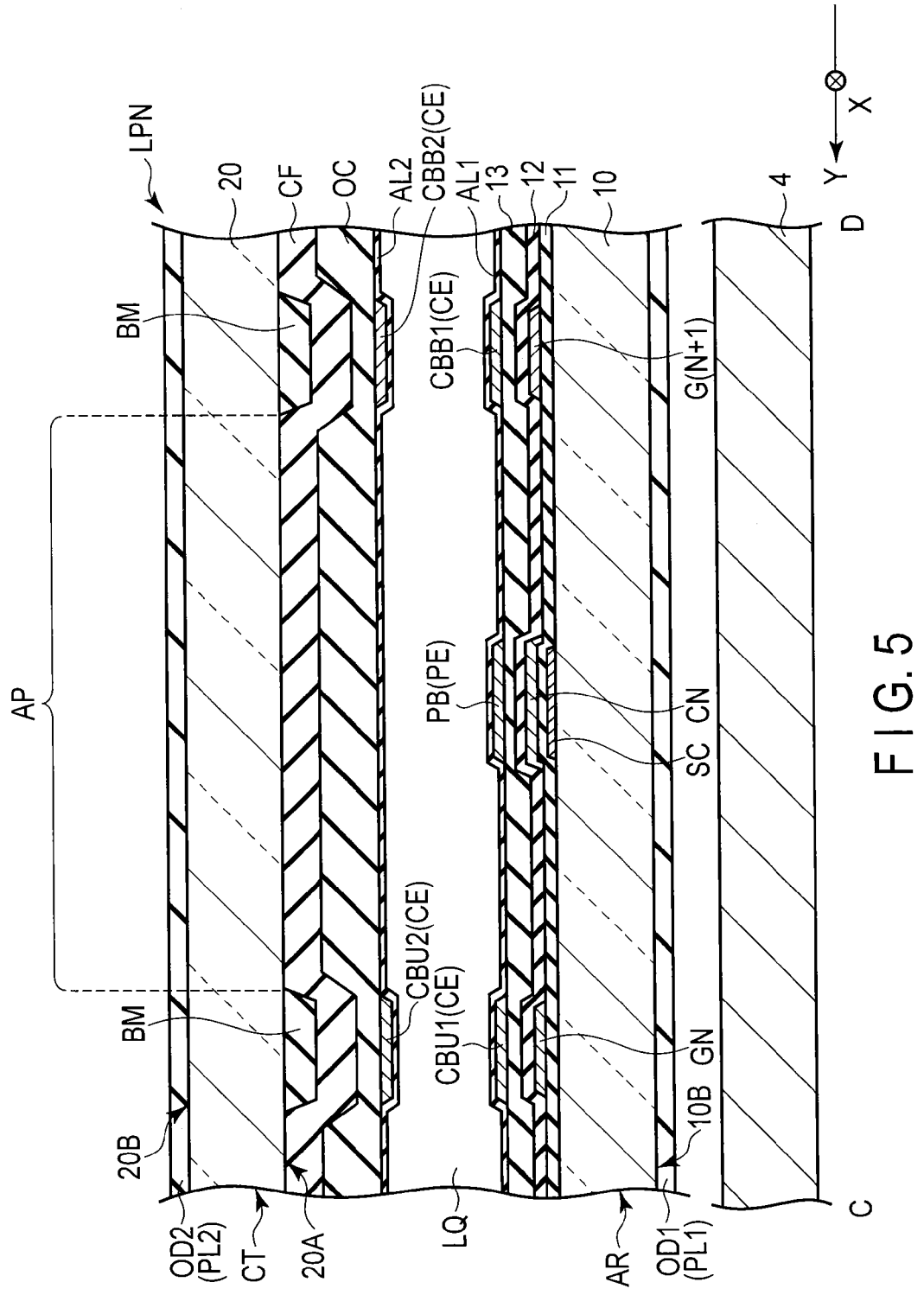
FIG. 5 is a schematic cross-sectional view, taken along line C-D in FIG. 3, showing a cross-sectional structure of the liquid crystal display panel shown in FIG. 3.

FIG. 4 is a schematic cross-sectional view, taken along line A-B in FIG. 3, showing a cross-sectional structure of the liquid crystal display panel LPN shown in FIG. 3, as viewed from the gate line G(N+1) side. FIG. 5 is a schematic cross-sectional view, taken along line C-D in FIG. 3, showing a cross-sectional structure of the liquid crystal display panel LPN shown in FIG. 3, as viewed from the source line S1 side. FIG. 4 and FIG. 5 show only parts which are necessary for the description.

A backlight 4 is disposed on the back side of the array substrate AR which constitutes the liquid crystal display panel LPN. Various modes are applicable to the backlight 4. A description of the detailed structure of the backlight 4 is omitted.

The array substrate AR is formed by using a first insulative substrate 10 having light transmissivity. The array substrate AR includes, on the inside of the first insulative substrate 10, that is, on the side facing the counter-substrate CT, a gate line GN, a gate line G(N+1), a storage capacitance line CN, a source line S1, a source line S2, a pixel electrode PE, a first common electrode CE1, a first insulation film 11, a second insulation film 12, a third insulation film 13, and a first alignment film AL1.

A semiconductor layer SC of polysilicon of the switching element, which is not described in detail, is formed between the first insulative substrate 10 and first insulation film 11. The storage capacitance line CN, gate line GN and gate line G(N+1) are formed on the first insulation film 11, and are covered with the second insulation film 12. The source line S1 and source line S2 are formed on the second insulation film 12 and are covered with the third insulation film 13. The third insulation film 13 is formed of a transparent resin material. The third insulation film 13 reduces stepped portions between the source lines S and the second insulation film 12. The surface of the third insulation film 13 is planarized. The thickness of the third insulation film 13 is, e.g. 1 µm or less.

The main pixel electrode PA and sub-pixel electrode PB of the pixel electrode PE, and the first main common electrode CAL1, first main common electrode CAR1, first sub-common electrode CBU1 and first sub-common electrode CBB1 of the first common electrode CE1, are formed on the third insulation film 13. Specifically, the pixel electrode PE and first common electrode CE1 are formed in the same layer and are formed of the same material, for instance, ITO. The first main common electrode CAL1 is located above the source line S1. The first main common electrode CAR1 is located above the source line S2. The first sub-common electrode CBU1 is located above the gate line GN. The first sub-common electrode CBB1 is located above the gate line G(N+1). The main pixel electrode PA is located between the neighboring first main common electrode CAL1 and first main common electrode CAR1. The sub-pixel electrode PB is located between the neighboring first sub-common electrode CBU1 and first sub-common electrode CBB1.

In the meantime, in the example illustrated, a capacitance, which is necessary for driving the pixel, is produced between the semiconductor layer SC and storage capacitance line CN which are opposed to each other via the first insulation film 11, and between the storage capacitance line CN and sub-pixel electrode PB which are opposed to each other via the second insulation film 12 and third insulation film 13.

The first alignment film AL1 is disposed on that surface of the array substrate AR, which is opposed to the counter-substrate CT, and the first alignment film AL1 extends over substantially the entirety of the active area ACT. The first alignment film AL1 covers the pixel electrode PE and the first common electrode CE1, and is also disposed on the third insulation film 13. The first alignment film AL1 is formed of a material which exhibits horizontal alignment properties.

The counter-substrate CT is formed by using a second insulative substrate 20 having light transmissivity. The counter-substrate CT includes a black matrix BM, a color filter CF, an overcoat layer OC, second common electrode CE2 and second alignment film AL2, on the inside of the second insulative substrate 20, that is, on that side of the second insulative substrate 20, which is opposed to the array substrate AR.

The black matrix BM partitions each pixel PX and forms an aperture portion AP. Specifically, the black matrix BM is disposed so as to be opposed to wiring portions, such as the source lines S, gate lines G and switching elements SW. In the example illustrated, the black matrix BM includes portions which are located above the source line S1 and source line S2 and extend in the second direction Y, and portions which are located above the gate line GN and gate line G(N+1) and extend in the first direction X, and the black matrix BM is formed in a grid shape. The black matrix BM is disposed on an inner surface 20A of the second insulative substrate 20, which is opposed to the array substrate AR.

The color filter CF is disposed in association with each pixel PX. Specifically, the color filter CF is disposed on an inside partitioned by the black matrix BM on the inner surface 20A of the second insulative substrate 20, and a part of the color filter CF extends over the black matrix BM. Color filters CF, which are disposed in the pixels PX neighboring in the first direction X, have mutually different colors. For example, the color filters CF are formed of resin materials which are colored in three primary colors of red, blue and green. A red color filter, which is formed of a resin material that is colored in red, is disposed in association with a red pixel. A blue color filter, which is formed of a resin material that is colored in blue, is disposed in association with a blue pixel. A green color filter, which is formed of a resin material that is colored in green, is disposed in association with a green pixel. Boundaries between these color filters CF are located at positions overlapping the black matrix BM.

The overcoat layer OC covers the color filters CF. The overcoat layer OC reduces the effect of asperities on the surface of the color filters CF. The overcoat layer OC is formed of, for example, a transparent resin material.

The second main common electrode CAL2, second main common electrode CAR2, second sub-common electrode CBU2 and second sub-common electrode CBB2 of the second common electrode CE2 are formed on that side of the overcoat layer OC, which is opposed to the array substrate AR, and are located below the black matrix BM. The first main common electrode CAL1 is located below the second main common electrode CAL2. The first main common electrode CAR1 is located below the second main common electrode CAR2. The first sub-common electrode CBU1 is located below the second sub-common electrode CBU2. The first sub-common electrode CBB1 is located below the second sub-common electrode CBB2. In the aperture portion AP, regions between the pixel electrode PE and the first common electrode CE1 and second common electrode CE2 correspond to transmissive regions through which backlight can pass.

The second alignment film AL2 is disposed on that surface of the counter-substrate CT, which is opposed to the array substrate AR, and the second alignment film AL2 extends over substantially the entirety of the active area ACT. The second alignment film AL2 covers the second common electrode CE2 and the overcoat layer OC. The second alignment film AL2 is formed of a material which exhibits horizontal alignment properties.

The above-described array substrate AR and counter-substrate CT are disposed such that their first alignment film AL1 and second alignment film AL2 are opposed to each other. In this case, columnar spacers, which are formed of, e.g. a resin material so as to be integral to one of the array substrate AR and counter-substrate CT, are disposed between the first alignment film AL1 of the array substrate AR and the second alignment film AL2 of the counter-substrate CT. Thereby, a predetermined cell gap, for example, a cell gap of 2 to 7 μm, is created. The array substrate AR and counter-substrate CT are attached by a sealant on the outside of the active area ACT in the state in which the predetermined cell gap is created therebetween. The liquid crystal layer LQ is held in the cell gap which is created between the array substrate AR and the counter-substrate CT, and is disposed between the first alignment film AL1 and second alignment film AL2. The liquid crystal layer LQ is composed of, for example, a liquid crystal material having a positive (positive-type) dielectric constant anisotropy.

A first optical element OD1 is attached to an outer surface of the array substrate AR, that is, an outer surface 10B of the first insulative substrate 10. The first optical element OD1 is located on that side of the liquid crystal display panel LPN, which is opposed to the backlight 4, and controls the polarization state of incident light which enters the liquid crystal display panel LPN from the backlight 4. The first optical element OD1 includes a first polarizer PL1 having a first polarization axis AX1. In the meantime, another optical element, such as a retardation plate, may be disposed between the first polarizer PL1 and the first insulative substrate 10.

A second optical element OD2 is attached to an outer surface of the counter-substrate CT, that is, an outer surface 20B of the second insulative substrate 20. The second optical element OD2 is located on the display surface side of the liquid crystal display panel LPN, and controls the polarization state of emission light emerging from the liquid crystal display panel LPN. The second optical element OD2 includes a second polarizer PL2 having a second polarization axis AX2. In the meantime, another optical element, such as a retardation plate, may be disposed between the second polarizer PL2 and the second insulative substrate 20.

The first polarization axis AX1 of the first polarizer PL1 and the second polarization axis AX2 of the second polarizer PL2 have a substantially orthogonal positional relationship (crossed Nicols). In this case, one of the polarizers is disposed, for example, such that the polarization axis thereof is substantially parallel or substantially perpendicular to the direction of extension of the main pixel electrode PA or the initial alignment direction of liquid crystal molecules. Specifically, when the direction of extension of the main pixel electrode PA or the initial alignment direction of liquid crystal molecules is the second direction Y, the absorption axis of one of the polarizers is substantially parallel to the second direction Y or substantially perpendicular to the second direction Y. In an example shown in part (a) of FIG. 3, the first polarizer PL1 is disposed such that the first polarization axis AX1 thereof is parallel to the first direction X, and the second polarizer PL2 is disposed such that the second polarization axis AX2 thereof is parallel to the second direction Y. In an example shown in part (b) of FIG. 3, the second polarizer PL2 is disposed such that the second polarization axis AX2 thereof is parallel to the first direction X, and the first polarizer PL1 is disposed such that the first polarization axis AX1 thereof is parallel to the second direction Y.

Next, the operation of the liquid crystal display panel LPN having the above-described structure is described.

Specifically, in a state in which no voltage is applied to the liquid crystal layer LQ, that is, in a state (OFF time) in which no electric field is produced between the pixel electrode PE and common electrode CE, the liquid crystal molecule LM of the liquid crystal layer LQ is aligned such that the major axis thereof is positioned in the first alignment treatment direction PD1 of the first alignment film AL1 and the second alignment treatment direction PD2 of the second alignment film AL2. This OFF time corresponds to the initial alignment state, and the alignment direction of the liquid crystal molecule LM at the OFF time corresponds to the initial alignment direction.

In the meantime, the initial alignment direction of the liquid crystal molecule LM corresponds to a direction in which the major axis of the liquid crystal molecule LM at the OFF time is orthogonally projected onto the X-Y plane. In this example, the first alignment treatment direction PD1 and the second alignment treatment direction PD2 are substantially parallel to the second direction Y and are identical. The liquid crystal molecule LM at the OFF time is initially aligned such that the major axis thereof is substantially parallel to the second direction Y, as indicated by a broken line in FIG. 3. In short, the initial alignment direction of the liquid crystal molecule LM is parallel to the second direction Y.

In the cross section of the liquid crystal layer LQ, the liquid crystal molecules LM are substantially horizontally aligned (the pre-tilt angle is substantially zero) in the middle part of the liquid crystal layer LQ, and the liquid crystal molecules LM are aligned with such pre-tilt angles that the liquid crystal molecules LM become symmetric in the vicinity of the array substrate AR (i.e. in the vicinity of first alignment film AL1) and in the vicinity of the counter-substrate CT (i.e. in the vicinity of second alignment film AL2), with respect to the middle part as the boundary (splay alignment). In the meantime, when the first alignment treatment direction PD1 and the second alignment treatment direction PD2 are parallel and opposite to each other, the liquid crystal molecules LM are aligned with substantially equal pre-tilt angles, in the cross section of the liquid crystal layer LQ, in the vicinity of the first alignment film AL1, in the vicinity of the second alignment film AL2, and in the middle part of the liquid crystal layer LQ (homogeneous alignment).

At this OFF time, part of light from the backlight 4 passes through the first polarizer PL1, and enters the liquid crystal display panel LPN. The light, which has entered the liquid crystal display panel LPN, is linearly polarized light which is perpendicular to the first polarization axis AX1 of the first polarizer PL1. The polarization state of linearly polarized light hardly varies when the light passes through the liquid crystal layer LQ at the OFF time. Thus, the linearly polarized light, which has passed through the liquid crystal display panel LPN, is absorbed by the second polarizer PL2 that is in the positional relationship of crossed Nicols in relation to the first polarizer PL1 (black display).

On the other hand, in a state in which a voltage is applied to the liquid crystal layer LQ, that is, in a state (ON time) in which an electric field is produced between the pixel electrode PE and the common electrode CE (first common electrode CE1 and second common electrode CE2), a lateral electric field (or an oblique electric field), which is substantially parallel to the substrates, is produced between the pixel electrode PE and the common electrode CE. The liquid crystal molecules LM are affected by the electric field between the pixel electrode PE and common electrode CE, and the polarization state thereof varies. In the example shown in FIG. 3, in the region between the pixel electrode PE and second main common electrode CRL2, the liquid crystal molecule LM in a lower-half region rotates clockwise relative to the second direction Y, and is aligned in a lower left direction in the Figure, and the liquid crystal molecule LM in an upper-half region rotates counterclockwise relative to the second direction Y, and is aligned in an upper left direction in the Figure. In the region between the pixel electrode PE and second main common electrode CAR2, the liquid crystal molecule LM in a lower-half region rotates counterclockwise relative to the second direction Y, and is aligned in a lower right direction in the Figure, and the liquid crystal molecule LM in an upper-half region rotates clockwise relative to the second direction Y, and is aligned in an upper right direction in the Figure.

As has been described above, in the state in which the electric field is produced between the pixel electrode PE and common electrode CE in each pixel PX, the liquid crystal molecules LM are aligned in a plurality of directions, with boundaries at positions overlapping the pixel electrodes PE, and domains are formed in the respective alignment directions. Specifically, a plurality of domains is formed in one pixel PX.

At this ON time, the polarization state of linearly polarized light, which has entered the liquid crystal display panel LPN, varies depending on the alignment state of the liquid crystal molecules LM when the light passes through the liquid crystal layer LQ. Thus, at the ON time, at least part of the light emerging from the liquid crystal layer LQ passes through the second polarizer PL2 (white display). However, at a position overlapping the pixel electrode or common electrode, since the liquid crystal molecules maintain the initial alignment state, black display is effected as in the case of the OFF time.

Next, a first structure example of the present embodiment is described.

FIG. 6 is a schematic view for describing the first structure example. FIG. 6 shows only the structural parts which are necessary for the description. As regards the pixel electrode, FIG. 6 shows only the main pixel electrode PA, and the depiction of the sub-pixel electrode is omitted. In the example illustrated, attention is paid to one column of pixels located between the source line S1 and source line S2, and all the pixel electrodes (main pixel electrodes PA1 to PA5 in FIG. 6), which are located between the source line S1 and source line S2, are electrically connected to the source line S1 via switching elements. In addition, the active area is composed of, for example, 480 lines. In this example, when a video signal of one frame is written in the active area ACT, the write of the video signal starts from a 1st line (i.e. a line of pixels connected to the gate line G1) of the 480 lines of the active area ACT, and the write of the video signal ends at a 480th line (i.e. a line of pixels connected to a gate line G480). Specifically, an area on the video signal write start side is that area of the active area ACT, which includes the gate line G1, and an area on the video signal write end side is that area of the active area ACT, which includes the gate line G480. Incidentally, there is a case in which the write of the video signal starts from the 480th line, and the write of the video signal ends at the 1st line. In this case, the area on the video signal write start side is that area of the active area ACT, which includes the gate line G480, and the area on the video signal write end side is that area of the active area ACT, which includes the gate line G1. Each of the source line S1 and source line S2 extends from the write start side to the write end side.

The active area ACT includes, for example, 5 areas. Specifically, the active area ACT includes a first area A1 located on the write start side, a second area A2 in which the video signal is written following the first area A1, a third area A3 in which the video signal is written following the second area A2, a fourth area A4 in which the video signal is written following the first area A3, and a fifth area A5 in which the video signal is written following the first area A4. The fifth area A5 in this case corresponds to an area located on the write end side. In this example, a description is given of the case in which the active area ACT is composed of five areas, but the number of divisions of the active area is not limited to 5.

The case in which equal numbers of lines are allocated to the five areas is now examined. Specifically, the first area A1 corresponds to an area from the gate line G1, which corresponds to the 1st line, to a gate line G96, which corresponds to a 96th line. The second area A2 corresponds to an area from a gate line G97, which corresponds to a 97th line, to a gate line G192, which corresponds to a 192nd line. The third area A3 corresponds to an area from a gate line G193, which corresponds to a 193rd line, to a gate line G288, which corresponds to a 288th line. The fourth area A4 corresponds to an area from a gate line G289, which corresponds to a 289th line, to a gate line G384, which corresponds to a 384th line. The fifth area A5 corresponds to an area from a gate line G385, which corresponds to a 385th line, to a gate line G480, which corresponds to a 480th line. Incidentally, different numbers of lines may be allocated to the five areas.

In the first area A1 on the write start side, a distance L11 between the main pixel electrode PA1 and the source line S1 is less than a distance L12 between the main pixel electrode PA1 and the source line S2. Specifically, the main pixel electrode PA1 is located on the source line S1 side of a center line O indicated by a broken line in FIG. 6, which is located at an equidistant position from the source line S1 and source line S2. On the other hand, in the fifth area A5 on the write end side, a distance L51 between the main pixel electrode PA5 and the source line S1 is greater than a distance L52 between the main pixel electrode PA5 and the source line S2. Specifically, the main pixel electrode PA5 is located on the source line S2 side of the center line O. For example, the distance L11 is 8 µm, the distance L12 is 12 µm, the distance L51 is 12 µm, and the distance L52 is 8 µm. Each of the distances described in this first structure example is a length in the first direction X.

In the third area A3 located at a middle point between the first area A1 and fifth area A5, a distance L31 between the main pixel electrode PA3 and source line S1 is substantially equal to a distance L32 between the main pixel electrode PA3 and source line S2. Specifically, the main pixel electrode PA3 is located on the center line O. For example, each of the distance L31 and distance L31 is 10 µm.

In the second area A2, a distance L21 between the main pixel electrode PA2 and the source line S1 is less than a distance L22 between the main pixel electrode PA2 and the source line S2. However, the difference between the distance L21 and distance L22 in the second area A2 is less than the difference between the distance L11 and distance L12 in the second area A1. Specifically, although the main pixel electrode PA2 is located on the source line S1 side of the center line O, the location of the main pixel electrode PA2 is biased to the center line O, compared to the main pixel electrode PA1. For example, the distance L21 is 9 µm, and the distance L22 is 11 µm.

In the fourth area A4, a distance L41 between the main pixel electrode PA4 and the source line S1 is greater than a distance L42 between the main pixel electrode PA4 and the source line S2. However, the difference between the distance L41 and distance L42 in the fourth area A4 is less than the difference between the distance L51 and distance L52 in the fifth area A5. Specifically, although the main pixel electrode PA4 is located on the source line S2 side of the center line O, the location of the main pixel electrode PA4 is biased to the center line O, compared to the main pixel electrode PA5. For example, the distance L41 is 11 µm, and the distance L42 is 9 µm.

In this manner, when attention is paid to the locations of the main pixel electrodes PA in the columns of pixels between the source line S1 and source line S2, the main pixel electrode PA on the write start side is biased to the source line S1 which is connected to the main pixel electrode PA. Toward the write end side from the write start side, the main pixel electrode PA shifts away from the source line S1. On the write end side, the main pixel electrode PA is biased to the source line S2 (i.e. the source line which is not connected to the main pixel electrode itself) which neighbors the source line S1. Incidentally, in each of the first area A1 to fifth area A5, the distances between the main pixel electrode PA and the source line S1 and source line S2 may not necessarily be fixed.

According to this first structure example, the influence of a leak electric field from the source line S which neighbors the pixel electrode PE can be relaxed, and degradation in display quality due to crosstalk can be suppressed. This point will now be described. Specifically, an examination is made of a comparative example in which all main pixel electrodes PA in the pixel column between the source line S1 and source line S2 are located on the center line O. When the polarity of a video signal, which is written from the source line S1, is different from the polarity of a video signal, which is written from the source line S2, a large potential difference is created between the main pixel electrode PA and source line S2, and there is concern that a variation of pixel transmittance due to the effect of a leak electric field from the source line S2 becomes non-negligible. For example, in the case where a video signal of +5 V is supplied to the source line S1 and a video signal of −5 V is supplied to the source line S2 at a predetermined timing in one frame period, relative to the common potential (0 V) of the common electrode CE, a large potential difference hardly occurs between the main pixel electrode PA and the source line S1 since the potential of the main pixel electrode PA and the potential of the source line S1 are equal (each of these potentials is +5 V) or these potentials are of the same polarity (in the frame period in which the main pixel electrode PA is kept at a positive potential, the video signal that is supplied to the source line S1 is of the positive polarity). On the other hand, since the polarity of potential of the main pixel electrode PA is different from the polarity of potential of the source line S2 (for example, while the potential of the main pixel electrode PA is kept at +5 V, the potential of the source line S2 is −5 V), a large potential difference is produced between the main pixel electrode PA and source line S2. Thus, since a desired electric field is produced in the region between the main pixel electrode PA and source line S1 and liquid crystal molecules are aligned in a desired direction, a necessary transmittance is obtained in this region. On the other hand, an excessive electric field is produced in the region between the main pixel electrode PA and source line S2, liquid crystal molecules are not aligned in a desired direction in this region, and there is case in which a necessary transmittance cannot be obtained in this region. In the case where an intermediate gray level (gray) is displayed in each pixel, while a transmittance corresponding to gray display is obtained in the region between the main pixel electrode PA and source line S1, a high transmittance close to white distance is obtained in the region between the main pixel electrode PA and source line S2. Thus, a desired transmittance is not obtained in units of a pixel.

In addition, in the structure of the comparative example, when use is made of such a driving method that the polarity of a video signal supplied to each source line S is reversed on a frame-by-frame basis, there is higher susceptibility to the influence of a leak electric field from the source lines S. For example, there is a case in which the source line S1 is supplied with a video signal of a positive polarity in a first frame and a video signal of a negative polarity in a second frame following the first frame, while the source line S2 is supplied with a video signal of a negative polarity in the first frame and a video signal of a positive polarity in the second frame. In this case, a large potential difference is produced between the main pixel electrode PA located on the write end side and the source line S1, and there is concern that a variation of pixel transmittance due to the effect of a leak electric field from the source line S1 becomes non-negligible. For example, in the case where a video signal of +5 V has been written in the main pixel electrode PA, which is located on the write end side, from the source line S1 in the first frame, the potential of the main pixel electrode PA is kept at +5 V immediately after the video signal write. Thus, no large potential difference is produced between the main pixel electrode PA and the source line S1. However, if a video signal of a negative polarity is supplied to the source line S1 in the second frame, a large potential difference is produced between the main pixel electrode PA and source line S1. At this time, in the second frame, since the potential of this main pixel electrode PA and the potential of the source line S2 are of the same polarity, no large potential difference is produced therebetween. Specifically, when the above-described driving method is applied, a desired electric field is produced in almost all frame periods in the region between the main pixel electrode PA, which is located on the write end side, and the source line S2, and liquid crystal molecules are aligned in a desired direction, and therefore a necessary transmittance is obtained in this region. On the other hand, an excessive electric field is produced between the main pixel electrode PA and the source line S1, liquid crystal molecules are not aligned in a desired direction, and there is a case in which a necessary transmittance cannot be obtained. Thus, in the case where an intermediate gray level (gray) is displayed in each pixel, while a transmittance corresponding to gray display is obtained in the region between the main pixel electrode PA and source line S2, a high transmittance close to white distance is obtained in the region between the main pixel electrode PA and source line S2. Thus, a desired transmittance is not obtained in units of a pixel. In the meantime, when this driving method is applied, a large potential difference is produced between the main pixel electrode PA, which is located on the write start side, and the source line S2, as described above, and there is an influence of a leak electric field from the source line S2.

As described above, in the structure of the comparative example, there is a tendency that an undesired electric field is produced between the main pixel electrode, which is located on the video signal write start side, and the source line which is not connected to this main pixel electrode, and there is a tendency that an undesired electric field is produced between the main pixel electrode, which is located on the video signal write end side, and the source line which is connected to this main pixel electrode. In the meantime, in the intermediate area between the write start side and the write end side, an undesired electric field is produced, in each frame, alternately between the main pixel electrode and one of the source lines and between the main pixel electrode and the other of the source lines. However, since the undesired electric field is temporally averaged in units of two frames, a display defect is not so conspicuous.

According to the first structure example of the embodiment, the distance L12 between the main pixel electrode located on the video signal write start side, for instance, the main pixel electrode PA1 located in the first area A1, and the source line S2, which is not connected to this main pixel electrode PA1, is greater than the distance L11 between the main pixel electrode PA1 and the source line S1 which is connected to this main pixel electrode PA1. Thus, even under the condition that a large potential difference is produced between the main pixel electrode PA1 and the source line S2, the influence of a leak electric field from the source line S2 can be relaxed. Specifically, while a desired electric field, which is to be normally produced, is produced in the region between the main pixel electrode PA1 and the source line S1, the influence of an undesired leak electric field is relaxed even in the region between the main pixel electrode PA1 and source line S2, and an electric field which is equal to a desired electric field can be produced in this region. Therefore, degradation in display quality on the video signal write start side can be suppressed.

In addition, the distance L51 between the main pixel electrode located on the video signal write end side, for instance, the main pixel electrode PA5 located in the fifth area A5, and the source line S1, which is connected to this main pixel electrode PA5, is greater than the distance L52 between the main pixel electrode PA5 and the source line S2 which is not connected to this main pixel electrode PA5. Thus, even under the condition that a large potential difference is produced between the main pixel electrode PA5 and the source line S1, the influence of a leak electric field from the source line S1 can be relaxed. Specifically, while a desired electric field, which is to be normally produced, is produced in the region between the main pixel electrode PA5 and the source line S2, the influence of an undesired leak electric field is relaxed even in the region between the main pixel electrode PA5 and source line S1, and an electric field which is equal to a desired electric field can be produced in this region. Therefore, degradation in display quality on the video signal write end side can be suppressed.

In the meantime, the distance L31 between the main pixel electrode located between the write start side and the write end side, for instance, the main pixel electrode PA3 located in the third area A3, and the source line S1 is equal to the distance L32 between the main pixel electrode PA3 and source line S2. However, as described above, since an undesired electric field is produced, in each frame, alternately between the region, which is located between the main pixel electrode PA3 and source line S1, and the region, which is located between the main pixel electrode PA3 and the source line S2, a display defect is not so conspicuous.

Therefore, degradation in display quality on the video signal write end side can be suppressed.

Figure 7:
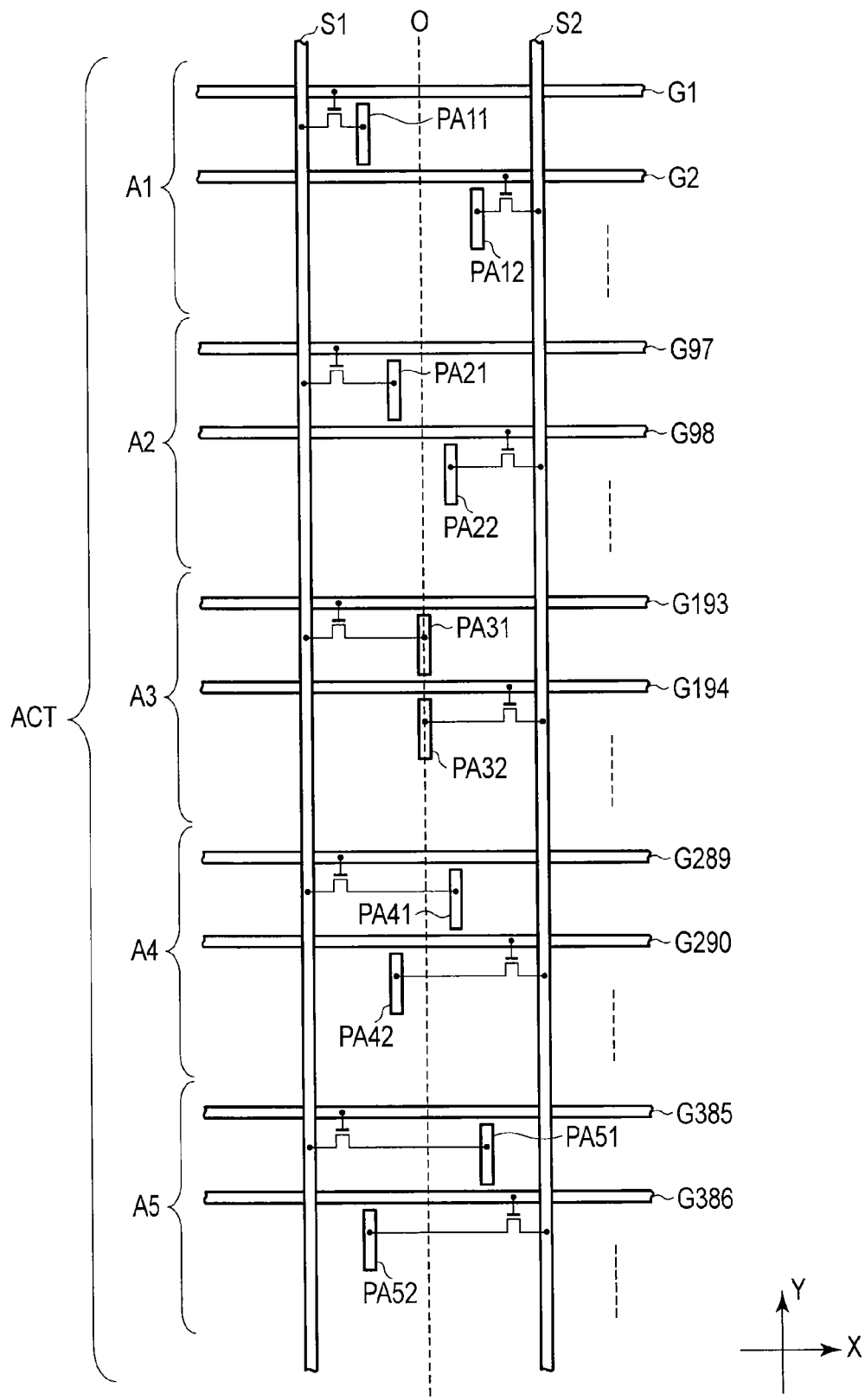
FIG. 7 is a schematic view for describing another example of the first structure example.

FIG. 7 is a schematic view for describing another example of the first structure example. FIG. 7 shows only the structural parts which are necessary for the description. The example shown in FIG. 7 differs from the example shown in FIG. 6 in that the pixel electrodes (main pixel electrodes PA1 to PA5 in FIG. 7), which are located between the source line S1 and source line S2, are electrically connected in an alternate fashion to the source line S1 and source line S2 via switching elements.

In the example illustrated, in odd-numbered lines of the active area ACT, that is, in lines of pixels connected to gate lines G1, G3, G5, . . . , the main pixel electrodes PA are electrically connected to the source line S1 via switching elements. In addition, in even-numbered lines of the active area ACT, that is, in lines of pixels connected to gate lines G2, G4, G6, . . . , the main pixel electrodes PA are electrically connected to the source line S2 via switching elements.

In this example, too, the distance between the main pixel electrode located on the video signal write start side and the source line, which is not connected to this main pixel electrode, is greater than the distance between the main pixel electrode and the source line which is connected to this main pixel electrode. For example, the distance between a main pixel electrode PA11, which is connected to the gate line G1, and the source line S2 is greater than the distance between the main pixel electrode PA11 and the source line S1. In addition, the distance between a main pixel electrode PA12, which is connected to the gate line G2, and the source line S1 is greater than the distance between the main pixel electrode PA12 and the source line S2. Thus, like the example illustrated in FIG. 6, degradation in display quality on the video signal write start side can be suppressed. Besides, the distance between the main pixel electrode located on the video signal write end side and the source line, which is connected to this main pixel electrode, is greater than the distance between the main pixel electrode and the source line which is not connected to this main pixel electrode. For example, the distance between a main pixel electrode PA51, which is connected to a gate line G385, and the source line S1 is greater than the distance between the main pixel electrode PA51 and the source line S2. In addition, the distance between a main pixel electrode PA52, which is connected to a gate line G386, and the source line S2 is greater than the distance between the main pixel electrode PA52 and the source line S1. Therefore, like the example illustrated in FIG. 6, degradation in display quality on the video signal write end side can be suppressed.

Next, a second structure example of the present embodiment is described.

FIG. 8 is a schematic view for describing the second structure example. FIG. 8 shows only the structural parts which are necessary for the description. The second structure example differs from the first structure example in that, while the main pixel electrodes PA are located on the center line O from the first area A1 to fifth area A5 of the active area ACT, the widths of extension of first main common electrodes CAL1, which are opposed to the source line S1, toward the main pixel electrodes PA, and the widths of extension of second main common electrodes CAR1, which are opposed to the source line S2, toward the main pixel electrodes PA, are different between the first area A1 to fifth area A5. In the description below, the "width" means a length in the first direction X.

A more concrete description is now given. In the first area A1 on the write start side, a width W11 of that portion of the first main common electrode CAL1, which extends from the edge of the source line S1 toward the main pixel electrode PA1, is less than a width W12 of that portion of the second main common electrode CAR1, which extends from the edge of the source line S2 toward the main pixel electrode PA1. The distance between the first main common electrode CAL1 and the main pixel electrode PA1 is greater than the distance between the second main common electrode CAR1 and the main pixel electrode PA1.

On the other hand, in the fifth area A5 on the write end side, a width W51 of that portion of the first main common electrode CAL1, which extends from the edge of the source line S1 toward the main pixel electrode PA5, is greater than a width W52 of that portion of the second main common electrode CAR1, which extends from the edge of the source line S2 toward the main pixel electrode PA5. The distance between the first main common electrode CAL1 and the main pixel electrode PA5 is less than the distance between the second main common electrode CAR1 and the main pixel electrode PA5.

In the third area A3, a width W31 of that portion of the first main common electrode CAL1, which extends from the edge of the source line S1 toward the main pixel electrode PA3, is substantially equal to a width W32 of that portion of the second main common electrode CAR1, which extends from the edge of the source line S2 toward the main pixel electrode PA3. The distance between the first main common electrode CAL1 and the main pixel electrode PA3 is substantially equal to the distance between the second main common electrode CAR1 and the main pixel electrode PA3. In the second area A2, a width W21 of that portion of the first main common electrode CAL1, which extends from the edge of the source line S1 toward the main pixel electrode PA2, is less than a width W22 of that portion of the second main common electrode CAR1, which extends from the edge of the source line S2 toward the main pixel electrode PA2. The distance between the first main common electrode CAL1 and the main pixel electrode PA2 is greater than the distance between the second main common electrode CAR1 and the main pixel electrode PA2. However, the difference between the width W21 and width W22 in the second area A2 is less than the difference between the width W11 and width W12 in the second area A1. In short, the width W21 is greater than the width W11 and is less than the width W31. In addition, the width W22 is less than the width W12 and is greater than the width W32. In the fourth area A4, a width W41 of that portion of the first main common electrode CAL1, which extends from the edge of the source line S1 toward the main pixel electrode PA4, is greater than a width W42 of that portion of the second main common electrode CAR1, which extends from the edge of the source line S2 toward the main pixel electrode PA4. The distance between the first main common electrode CAL1 and the main pixel electrode PA4 is less than the distance between the second main common electrode CAR1 and the main pixel electrode PA4. However, the difference between the width W41 and width W42 in the fourth area A4 is less than the difference between the width W51 and width W52 in the fifth area A5. In short, the width W41 is greater than the width W31 and is less than the width W51. In addition, the width W42 is less than the width W32 and is greater than the width W52.

In this manner, when attention is paid to the locations of the first main common electrode CAL1 opposed to the source line S1 and the first main common electrode CAR1 opposed to the source line S2, the first main common electrode CAR1 opposed to the source line S2, which is not electrically connected to the main pixel electrode PA, extends toward the main pixel electrode PA with a greater width, on the write start side, than the first main common electrode CAL1 opposed to the source line S1 which is electrically connected to the main pixel electrode PA. Toward the write end side from the write start side, the width of extension of the first main common electrode CAR1 toward the main pixel electrode PA gradually decreases, and the width of extension of the first main common electrode CAL1 toward the main pixel electrode PA gradually increases. On the write end side, the first main common electrode CAL1 extends toward the main pixel electrode PA with a greater width than the first main common electrode CAR1. Incidentally, in each of the first area A1 to fifth area A5, the widths of extension of the first main common electrode CAL1 and first main common electrode CAR1 toward the main pixel electrode PA may not necessarily be fixed.

According to this second structure example, on the write start side, a leak electric field from the source line S2, which is on the side that is not connected to the main pixel electrode PA, can be shielded by the first main common electrode CAR1, and the first main common electrode CAR1 can be located closer to the main pixel electrode PA, thereby increasing an electric field between the first main common electrode CAR1 and the main pixel electrode PA. In addition, on the write end side, a leak electric field from the source line S1, which is on the side that is connected to the main pixel electrode PA, can be shielded by the first main common electrode CAL1, and the first main common electrode CAL1 can be located closer to the main pixel electrode PA, thereby increasing an electric field between the first main common electrode CAL1 and the main pixel electrode PA. Therefore, degradation in display quality can be suppressed.

In the meantime, the second structure example is not limited to the example shown in FIG. 8, in which the first main common electrode CAL1 and first main common electrode CAR1 are formed stepwise from the write start side toward the write end side.

Figure 9:
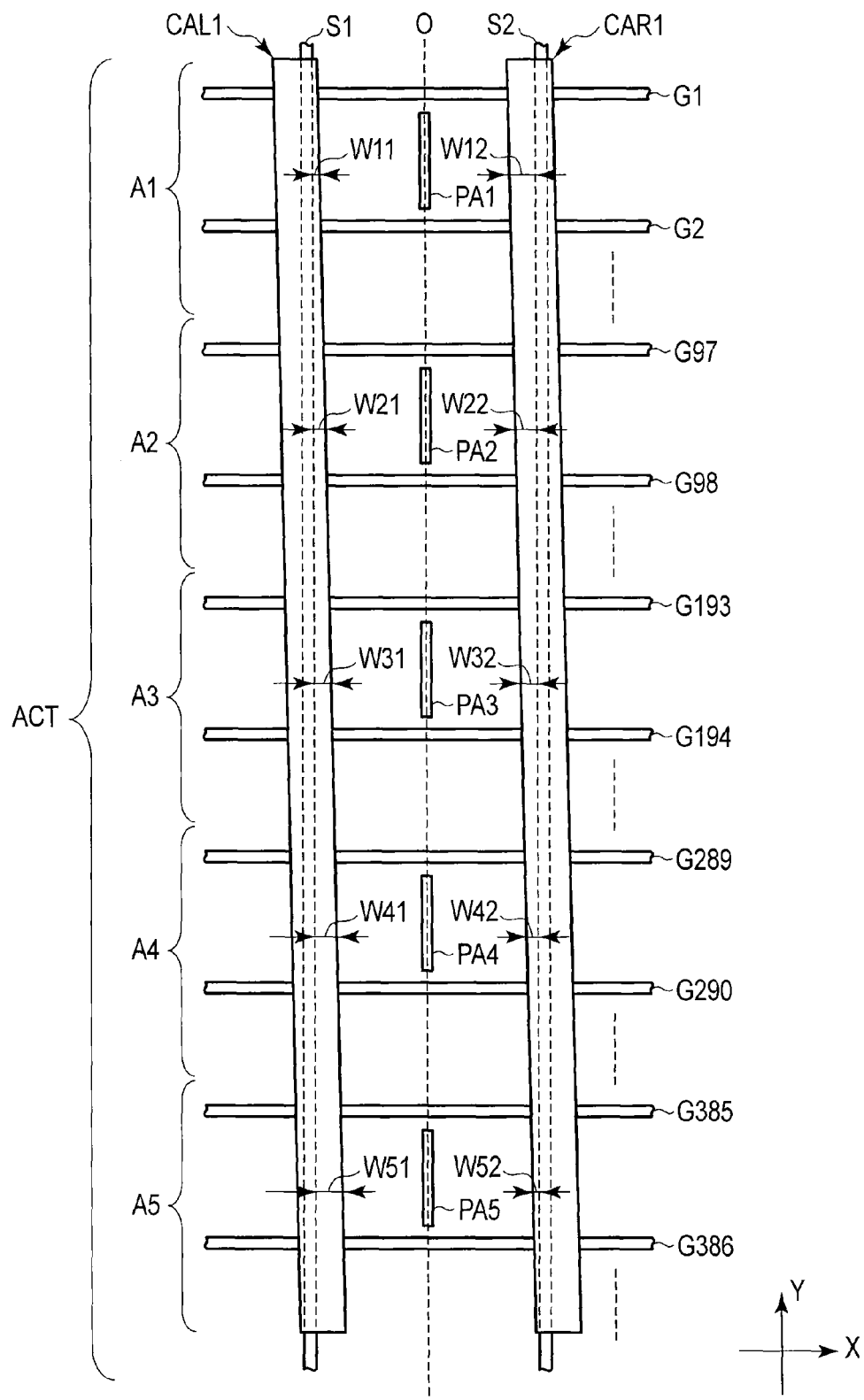
FIG. 9 is a schematic view for describing another example of the second structure example.

FIG. 9 is a schematic view for describing another example of the second structure example. The example shown in FIG. 9 differs from the example shown in FIG. 8 in that the first main common electrode CAL1 is opposed to the source line S1, while extending in an oblique direction to the direction of extension of the source line S1, and the first main common electrode CAR1 is opposed to the source line S2, while extending in an oblique direction to the direction of extension of the source line S2. It should be noted, however, that the first main common electrode CAL1 and first main common electrode CAR1 are parallel to each other.

In this example, like the example shown in FIG. 8, degradation in display quality can be suppressed on the video signal write start side and the video signal write end side.

Next, a third structure example of the present embodiment is described.

Figure 10:
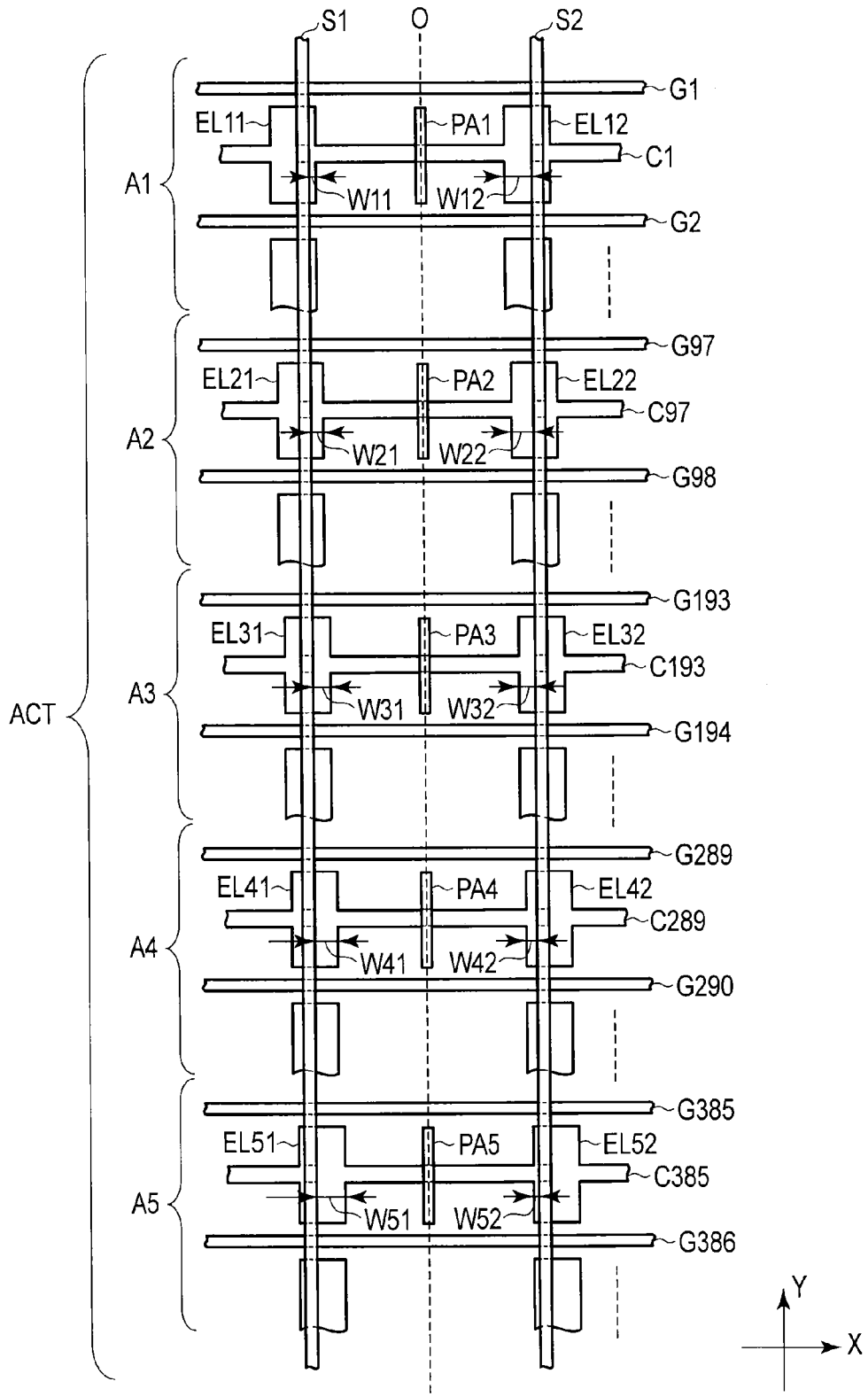
FIG. 10 is a schematic view for describing a third structure example of the embodiment.

FIG. 10 is a schematic view for describing the third structure example. FIG. 10 shows only the structural parts which are necessary for the description. The third structure example differs from the first structure example in that, while the main pixel electrodes PA are located on the center line O from the first area A1 to fifth area A5 of the active area ACT, the storage capacitance line CN includes a first electrode portion EL1 which is opposed to the source line S1, and a second electrode portion EL2 which is opposed to the source line S2, and the widths of extension of first electrode portions EL1 and second electrode portions EL2 toward the main pixel electrodes PA are different among the first area A1 to fifth area A5. Although not described in detail, each source line is located between either of the electrode portions of the storage capacitance line and the first main common electrode.

A more concrete description is now given. In the first area A1 on the write start side, for example, a storage capacitance line C1, which is located between the gate line G1 and gate line G2, includes a first electrode portion EL11 and a second electrode portion EL12, which extend in the second direction Y between the gate line G1 and gate line G2. The first electrode portion EL11 is spaced apart from the gate line G1 and gate line G2, and is located in a layer under the source line S1. The second electrode portion EL12 is spaced apart from the gate line G1 and gate line G2, and is located in a layer under the source line S2. A width W11 of that portion of the first electrode portion EL11, which extends from the edge of the source line S1 toward the main pixel electrode PA1, is less than a width W12 of that portion of the second electrode portion EL12, which extends from the edge of the source line S2 toward the main pixel electrode PA1. The distance between the first electrode portion EL11 and the main pixel electrode PA1 is greater than the distance between the second electrode portion EL12 and the main pixel electrode PA1.

On the other hand, in the fifth area A5 on the write end side, for example, a storage capacitance line C385, which is located between the gate line G385 and gate line G386, includes a first electrode portion EL51 and a second electrode portion EL52, which extend in the second direction Y between the gate line G385 and gate line G386. The first electrode portion EL51 is located in a layer under the source line S1, and the second electrode portion EL52 is located in a layer under the source line S2. A width W51 of that portion of the first electrode portion EL51, which extends from the edge of the source line S1 toward the main pixel electrode PA5, is greater than a width W52 of that portion of the second electrode portion EL52, which extends from the edge of the source line S2 toward the main pixel electrode PA5. The distance between the first electrode portion EL51 and the main pixel electrode PA5 is less than the distance between the second electrode portion EL52 and the main pixel electrode PA5.

In the third area A3, for example, a storage capacitance line C193, which is located between the gate line G193 and gate line G194, includes a first electrode portion EL31 and a second electrode portion EL32, which extend in the second direction Y between the gate line G193 and gate line G194. The first electrode portion EL31 is located in a layer under the source line S1, and the second electrode portion EL32 is located in a layer under the source line S2. A width W31 of that portion of the first electrode portion EL31, which extends from the edge of the source line S1 toward the main pixel electrode PA3, is substantially equal to a width W32 of that portion of the second electrode portion EL32, which extends from the edge of the source line S2 toward the main pixel electrode PA3. The distance between the first electrode portion EL31 and the main pixel electrode PA3 is substantially equal to the distance between the second electrode portion EL32 and the main pixel electrode PA3. In the second area A2, for example, a storage capacitance line C97, which is located between the gate line G97 and gate line G98, includes a first electrode portion EL21 and a second electrode portion EL22, which extend in the second direction Y between the gate line G97 and gate line G98. The first electrode portion EL21 is located in a layer under the source line S1, and the second electrode portion EL22 is located in a layer under the source line S2. A width W21 of that portion of the first electrode portion EL21, which extends from the edge of the source line S1 toward the main pixel electrode PA2, is less than a width W22 of that portion of the second electrode portion EL22, which extends from the edge of the source line S2 toward the main pixel electrode PA2. The distance between the first electrode portion EL21 and the main pixel electrode PA2 is greater than the distance between the second electrode portion EL22 and the main pixel electrode PA2. However, the difference between the width W21 and width W22 in the second area A2 is less than the difference between the width W11 and width W12 in the second area A1. In short, the width W21 is greater than the width W11 and is less than the width W31. In addition, the width W22 is less than the width W12 and is greater than the width W32. In the fourth area A4, for example, a storage capacitance line C289, which is located between the gate line G289 and gate line G290, includes a first electrode portion EL41 and a second electrode portion EL42, which extend in the second direction Y between the gate line G289 and gate line G290. The first electrode portion EL41 is located in a layer under the source line S1, and the second electrode portion EL42 is located in a layer under the source line S2. A width W41 of that portion of the first electrode portion EL41, which extends from the edge of the source line S1 toward the main pixel electrode PA4, is greater than a width W42 of that portion of the second electrode portion EL42, which extends from the edge of the source line S2 toward the main pixel electrode PA4. The distance between the first electrode portion EL41 and the main pixel electrode PA4 is less than the distance between the second electrode portion EL42 and the main pixel electrode PA4. However, the difference between the width W41 and width W42 in the fourth area A4 is less than the difference between the width W51 and width W52 in the fifth area A5. In short, the width W41 is greater than the width W31 and is less than the width W51. In addition, the width W42 is less than the width W32 and is greater than the width W52.

In this manner, when attention is paid to the locations of the first electrode portion EL1 opposed to the source line S1 and the second electrode portion EL2 opposed to the source line S2, the second electrode portion EL2 opposed to the source line S2, which is not electrically connected to the main pixel electrode PA, extends toward the main pixel electrode PA with a greater width, on the write start side, than the first electrode portion EL1 opposed to the source line S1 which is electrically connected to the main pixel electrode PA. Toward the write end side from the write start side, the width of extension of the second electrode portion EL2 toward the main pixel electrode PA gradually decreases, and the width of extension of the first electrode portion EL1 toward the main pixel electrode PA gradually increases. On the write end side, the first electrode portion EL1 extends toward the main pixel electrode PA with a greater width than the second electrode portion EL2. Incidentally, in each of the first area A1 to fifth area A5, the widths of extension of the first electrode portion EL1 and second electrode portion EL2 toward the main pixel electrode PA may not necessarily be fixed.

According to this third structure example, on the write start side, a leak electric field from the source line S2, which is on the side that is not connected to the main pixel electrode PA, can be shielded by the first main common electrode CAR1 which is located in a layer above the source line S2 and the second electrode portion EL2 which is located in a layer under the source line S2. On the write end side, a leak electric field from the source line S1, which is on the side that is connected to the main pixel electrode PA, can be shielded by the first main common electrode CAL' which is located in a layer above the source line S1 and the first electrode portion EL1 which is located in a layer under the source line S1. Therefore, degradation in display quality can be suppressed.

Next, a fourth structure example of the present embodiment is described.

Figure 11:
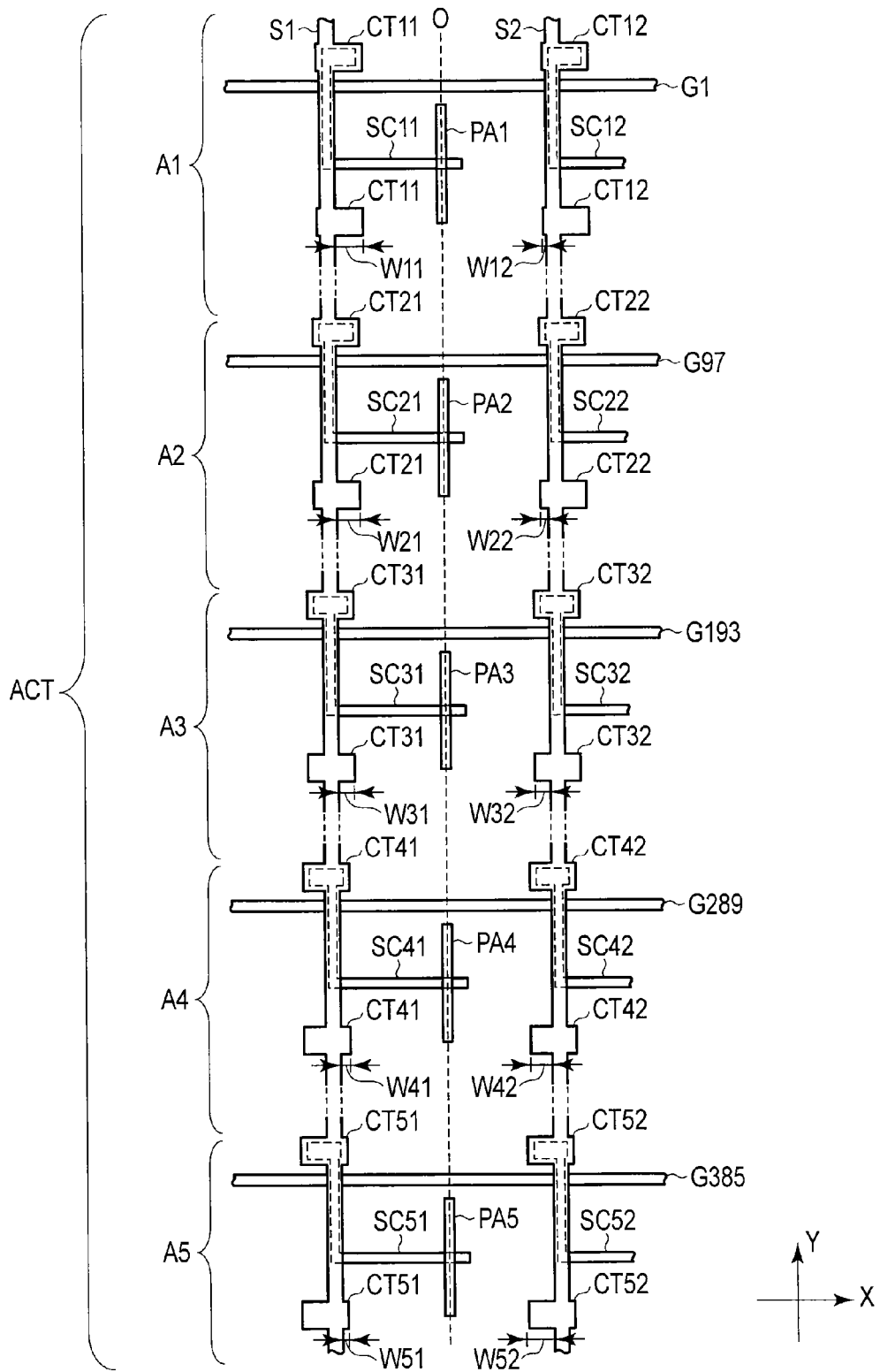
FIG. 11 is a schematic view for describing a fourth structure example of the embodiment.

FIG. 11 is a schematic view for describing the fourth structure example. FIG. 11 shows only the structural parts which are necessary for the description. The fourth structure example differs from the first structure example in that, while the main pixel electrodes PA are located on the center line O from the first area A1 to fifth area A5 of the active area ACT, the source line S1 includes a first contact portion CT1 and the source line S2 includes a second contact portion CT2, and the widths of extension of first contact portion CT1 and second contact portion CT2 toward the main pixel electrodes PA are different among the first area A1 to fifth area A5.

A more concrete description is now given. In the first area A1 on the write start side, the source line S1 includes a first contact portion CT11 which is put in contact with a semiconductor layer SC11 that is electrically connected to the main pixel electrode PA1. The source line S2 includes a second contact portion CT12 which is put in contact with a semiconductor layer SC12 of a neighboring pixel. A width W11 of that portion of the first contact portion CT11, which extends from the edge of the source line S1 toward the main pixel electrode PA1, is greater than a width W12 of that portion of the second contact portion CT12, which extends from the edge of the source line S2 toward the main pixel electrode PA1. The distance between the first contact portion CT11 and the main pixel electrode PA1 is less than the distance between the second contact portion CT12 and the main pixel electrode PA1.

On the other hand, in the fifth area A5 on the write end side, the source line S1 includes a first contact portion CT51 which is put in contact with a semiconductor layer SC51 that is electrically connected to the main pixel electrode PA5. The source line S2 includes a second contact portion CT52 which is put in contact with a semiconductor layer SC52 of a neighboring pixel. A width W51 of that portion of the first contact portion CT51, which extends from the edge of the source line S1 toward the main pixel electrode PA5, is less than a width W52 of that portion of the second contact portion CT52, which extends from the edge of the source line S2 toward the main pixel electrode PA5. The distance between the first contact portion CT51 and the main pixel electrode PA5 is greater than the distance between the second contact portion CT52 and the main pixel electrode PA5.

In the third area A3, the source line S1 includes a first contact portion CT31 which is put in contact with a semiconductor layer SC31 that is electrically connected to the main pixel electrode PA3. The source line S2 includes a second contact portion CT32 which is put in contact with a semiconductor layer SC32 of a neighboring pixel. A width W31 of that portion of the first contact portion CT31, which extends from the edge of the source line S1 toward the main pixel electrode PA3, is substantially equal to a width W32 of that portion of the second contact portion CT32, which extends from the edge of the source line S2 toward the main pixel electrode PA3. The distance between the first contact portion CT31 and the main pixel electrode PA3 is substantially equal to the distance between the second contact portion CT32 and the main pixel electrode PA3. In the second area A2, the source line S1 includes a first contact portion CT21 which is put in contact with a semiconductor layer SC21 that is electrically connected to the main pixel electrode PA2. The source line S2 includes a second contact portion CT22 which is put in contact with a semiconductor layer SC22 of a neighboring pixel. A width W21 of that portion of the first contact portion CT21, which extends from the edge of the source line S1 toward the main pixel electrode PA2, is greater than a width W22 of that portion of the second contact portion CT22, which extends from the edge of the source line S2 toward the main pixel electrode PA2. The distance between the first contact portion CT21 and the main pixel electrode PA2 is less than the distance between the second contact portion CT22 and the main pixel electrode PA2. However, the difference between the width W21 and width W22 in the second area A2 is less than the difference between the width W11 and width W12 in the second area A1. In short, the width W21 is greater than the width W31 and is less than the width W11. In addition, the width W22 is less than the width W32 and is greater than the width W12. In the fourth area A4, the source line S1 includes a first contact portion CT41 which is put in contact with a semiconductor layer SC41 that is electrically connected to the main pixel electrode PA4. The source line S2 includes a second contact portion CT42 which is put in contact with a semiconductor layer SC42 of a neighboring pixel. A width W41 of that portion of the first contact portion CT41, which extends from the edge of the source line S1 toward the main pixel electrode PA4, is less than a width W42 of that portion of the second contact portion CT42, which extends from the edge of the source line S2 toward the main pixel electrode PA4. The distance between the first contact portion CT41 and the main pixel electrode PA4 is greater than the distance between the second contact portion CT42 and the main pixel electrode PA4. However, the difference between the width W41 and width W42 in the fourth area A4 is less than the difference between the width W51 and width W52 in the fifth area A5. In short, the width W41 is greater than the width W51 and is less than the width W31. In addition, the width W42 is less than the width W52 and is greater than the width W32.

In this manner, when attention is paid to the locations of the first contact portion CT1 of the source line S1 and the second contact portion CT2 of the source line S2, the first contact portion CT1 of the source line S1, which is electrically connected to the main pixel electrode PA, extends toward the main pixel electrode PA with a greater width, on the write start side, than the second contact portion CT2 of the source line S2 which is not electrically connected to the main pixel electrode PA. Toward the write end side from the write start side, the width of extension of the first contact portion CT1 toward the main pixel electrode PA gradually decreases, and the width of extension of the second contact portion CT2 toward the main pixel electrode PA gradually increases. On the write end side, the second contact portion CT2 extends toward the main pixel electrode PA with a greater width than the first contact portion CT1. Incidentally, in each of the first area A1 to fifth area A5, the widths of extension of the first contact portion CT1 and second contact portion CT2 toward the main pixel electrode PA may not necessarily be fixed.

According to this fourth structure example, on the write start side, the second contact portion CT2 of the source line S2, which is on the side that is not connected to the main pixel electrode PA, is away from the main pixel electrode PA. Thus, the influence of a leak electric field from the second contact portion CT2 can be relaxed. In addition, on the write end side, the first contact portion CT1 of the source line S1, which is on the side that is connected to the main pixel electrode PA, is away from the main pixel electrode PA. Thus, the influence of a leak electric field from the first contact portion CT1 can be relaxed. Therefore, degradation in display quality can be suppressed.

The first to fourth structure examples have been described above. Two or more of these structure examples may be combined.

Next, the advantageous effects of the present embodiment were verified.

FIG. 12 is a view for explaining the definition of a crosstalk ratio which is introduced in the present embodiment. Specifically, in the case where a rectangular window WDW was displayed at a substantially central part of the active area ACT and black display or white display was effected in the window WDW and intermediate-color display was effected on a peripheral part of the window WDW, luminances around the window WDW were measured. The luminances at four locations indicated in FIG. 12 were W1, W2, W3 and W4, respectively. In addition, in the case where the same intermediate color was displayed on the entirety of the same active area ACT, luminances at the same four locations as in the above case were measured. The luminances at the four locations indicated in FIG. 12 were G1, G2, G3 and G4, respectively. At this time, the crosstalk ratio is defined by:

crosstalk ratio=$|W(n)-G(n)|/G(n)\times 100$ (wherein $n=1\sim 4$)

Crosstalk ratios were measured with respect to the above-described comparative example and the first structure example of the embodiment shown in FIG. 6. When the crosstalk ratio of the comparative example was normalized to 1, the crosstalk ratio of the first structure example was 0.69. It was thus confirmed that according to the present embodiment, the crosstalk was successfully be decreased.

In the present embodiment, the description has been given of the liquid crystal display panel LPN which is configured such that the pixel electrodes PE are formed on the array substrate AR, and at least a part of the common electrode CE is formed on the counter-substrate CT. The above-described structure examples, however, are also applicable to a liquid crystal display panel which is constructed by combining an array substrate on which the pixel electrodes PE and first common electrode CE1 are formed and a counter substrate CT on which no common electrode is formed.

As has been described above, according to the present embodiment, a liquid crystal display device, which can suppress degradation in display quality, can be provided.

Other modes of the present embodiment are additionally described below.

(1) A liquid crystal display device including:
a first substrate including a first source line and a second source line which are disposed with a distance in a first direction and extend in a second direction perpendicular to the first direction from a first area on a video signal write start side to a second area on a video signal write end side, a first main pixel electrode of a strip shape which is electrically connected to the first source line in the first area, is located between the first source line and the second source line and extends in the second direction, a second main pixel electrode of a strip shape which is electrically connected to the first source line in the second area, is located between the first source line and the second source line and extends in the second direction, a first main common electrode opposed to the first source line, and a second main common electrode having the same potential as the first main common electrode and opposed to the second source line, the first source line including a first contact portion extending with a first width toward the first main pixel electrode, the second source line including a second contact portion extending with a second width, which is less than the first width, toward the first main pixel electrode, the first source line further including a third contact portion extending with a third width toward the second main pixel electrode, and the second source line further including a fourth contact portion extending with a fourth width, which is greater than the third width, toward the second main pixel electrode;

a second substrate disposed to be opposed to the first substrate; and a liquid crystal layer held between the first substrate and the second substrate.

(2) The liquid crystal display device of (1), wherein the first substrate further includes a third main pixel electrode of a strip shape which is electrically connected to the first source line in a third area between the first area and the second area, is located between the first source line and the second source line and extends in the second direction, the first source line includes a fifth contact portion extending with a fifth width toward the third main pixel electrode, and the second source line includes a sixth contact portion extending with a sixth width, which is substantially equal to the fifth width, toward the third main pixel electrode.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
a first substrate including a first source line and a second source line which are disposed with a distance in a first direction and extend in a second direction perpendicular to the first direction from a first area on a video signal write start side to a second area on a video signal write end side, a first main pixel electrode of a strip shape which is electrically connected to the first source line in the first area, is located between the first source line and the second source line and extends in the second direction, a second main pixel electrode of a strip shape which is electrically connected to the first source line in the second area, is located between the first source line and the second source line and extends in the second direction, a first main common electrode opposed to the first source line, and a second main common electrode having the same potential as the first main common electrode and opposed to the second source line, the first substrate being configured such that a first width of that portion of the first main common electrode, which extends from the first source line toward the first main pixel electrode, is less than a second width of that portion of the second main common electrode, which extends from the second source line toward the first main pixel electrode, and a third width of that portion of the first main common electrode, which extends from the first source line toward the second main pixel electrode, is greater than a fourth width of that portion of the second main common electrode, which extends from the second source line toward the second main pixel electrode;

a second substrate disposed to be opposed to the first substrate; and a liquid crystal layer held between the first substrate and the second substrate.

2. The liquid crystal display device of claim 1, wherein the first substrate further includes a third main pixel electrode of a strip shape which is electrically connected to the first source line in a third area between the first area and the second area, is located between the first source line and the second source line and extends in the second direction, and a fifth width of that portion of the first main common electrode, which extends from the first source line toward the third main pixel electrode, is substantially equal to a sixth width of that portion of the second main common electrode, which extends from the second source line toward the third main pixel electrode.

3. The liquid crystal display device of claim 1, wherein there are provided one said first main pixel electrode and one said second main pixel electrode.

4. The liquid crystal display device of claim 1, wherein the first source line is supplied with a video signal of a positive polarity in a first frame and is supplied with a video signal of a negative polarity in a second frame which follows the first frame, and the second source line is supplied with a video signal of a negative polarity in the first frame and is supplied with a video signal of a positive polarity in the second frame.

5. The liquid crystal display device of claim 1, wherein the second substrate further includes a third main common electrode having the same potential as the first main common electrode and opposed to the first main common electrode, and a fourth main common electrode having the same potential as the second main common electrode and opposed to the second main common electrode.

6. The liquid crystal display device of claim 5, wherein the first substrate further includes a first sub-common electrode which is continuous with the first main common electrode and the second main common electrode and extends in the first direction, and the second substrate further includes a second sub-common electrode having the same potential as the first sub-common electrode and opposed to the first sub-common electrode.

* * * * *